(12) United States Patent
Clayton et al.

(10) Patent No.: US 12,457,223 B2
(45) Date of Patent: Oct. 28, 2025

(54) SYSTEM AND METHOD FOR AGGREGATING AND SECURING MANAGED DETECTION AND RESPONSE CONNECTION INTERFACES BETWEEN MULTIPLE NETWORKED SOURCES

(71) Applicant: QOMPLX LLC, Reston, VA (US)

(72) Inventors: Randy Clayton, Frederick, MD (US);
Jason Crabtree, Vienna, VA (US);
Angadbir Salaria, Herndon, VA (US);
Andrew Sellers, Monument, CO (US);
Marian Trnkus, Chevy Chase, MD (US)

(73) Assignee: QOMPLX LLC, Reston, VA (US)

( * ) Notice: Subject to any disclaimer, the term of this patent is extended or adjusted under 35 U.S.C. 154(b) by 962 days.

(21) Appl. No.: 17/389,704

(22) Filed: Jul. 30, 2021

(65) Prior Publication Data
US 2022/0060510 A1    Feb. 24, 2022

Related U.S. Application Data

(63) Continuation-in-part of application No. 17/074,882, filed on Oct. 20, 2020, now Pat. No. 11,831,682,
(Continued)

(51) Int. Cl.
*H04L 9/40*    (2022.01)
*G06F 16/2458*    (2019.01)
(Continued)

(52) U.S. Cl.
CPC ...... *H04L 63/1408* (2013.01); *G06F 16/2477* (2019.01); *G06F 16/951* (2019.01);
(Continued)

(58) Field of Classification Search
CPC . H04L 63/20; H04L 63/1425; H04L 63/1441; H04L 41/149; H04L 63/1433;
(Continued)

(56) References Cited

U.S. PATENT DOCUMENTS

| 5,669,000 A | 9/1997 | Jessen et al. |
| 6,256,544 B1 | 7/2001 | Weissinger |

(Continued)

FOREIGN PATENT DOCUMENTS

| CN | 105302532 B | 6/2018 |
| WO | 2014159150 A1 | 10/2014 |
| WO | 2017075543 A1 | 5/2017 |

*Primary Examiner* — Farid Homayounmehr
*Assistant Examiner* — Judy Bazna
(74) *Attorney, Agent, or Firm* — Galvin Patent Law LLC; Brian R Galvin

(57) ABSTRACT

A system and method for a flexible, high-speed Managed Detection and Response platform that ingests, parses, normalizes, monitors, and correlates nearly any log source or security tool output. The MDR comprising of a declarative connector service that tags events with appropriate data source labels to facilitating data isolation, proper handling, and provenance across multiple customers and security products but otherwise aggregate alerts into a single data stream for consumption by the MDR SOC operators. A connector service further provides a programmatic (API-based) means to interchange data securely across environments. Event data is aggregated by the Managed Detection and Response platform that then utilizes enhanced log ingest capabilities to process the data allowing SOC operators to be able to write rules against the alerts.

11 Claims, 20 Drawing Sheets

Related U.S. Application Data which is a continuation-in-part of application No. 17/035,029, filed on Sep. 28, 2020, now Pat. No. 11,546,380, which is a continuation-in-part of application No. 17/008,276, filed on Aug. 31, 2020, now Pat. No. 11,323,484, which is a continuation-in-part of application No. 17/000,504, filed on Aug. 24, 2020, now Pat. No. 11,477,245, which is a continuation-in-part of application No. 16/855,724, filed on Apr. 22, 2020, now Pat. No. 11,218,510, which is a continuation-in-part of application No. 16/836,717, filed on Mar. 31, 2020, now Pat. No. 10,917,428, and a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, said application No. 17/000,504 is a continuation-in-part of application No. 16/412,340, filed on May 14, 2019, now Pat. No. 11,539,663, which is a continuation-in-part of application No. 16/267,893, filed on Feb. 5, 2019, now abandoned, which is a continuation-in-part of application No. 16/248,133, filed on Jan. 15, 2019, now abandoned, said application No. 16/836,717 is a continuation-in-part of application No. 15/887,496, filed on Feb. 2, 2018, now Pat. No. 10,783,241, said application No. 16/248,133 is a continuation-in-part of application No. 15/849,901, filed on Dec. 21, 2017, now Pat. No. 11,023,284, which is a continuation-in-part of application No. 15/835,436, filed on Dec. 7, 2017, now Pat. No. 10,572,828, and a continuation-in-part of application No. 15/835,312, filed on Dec. 7, 2017, now Pat. No. 11,055,451, said application No. 16/720,383 is a continuation of application No. 15/823,363, filed on Nov. 27, 2017, now Pat. No. 10,560,483, said application No. 15/887,496 is a continuation-in-part of application No. 15/823,285, filed on Nov. 27, 2017, now Pat. No. 10,740,096, and a continuation-in-part of application No. 15/818,733, filed on Nov. 20, 2017, now Pat. No. 10,673,887, said application No. 16/248,133 is a continuation-in-part of application No. 15/813,097, filed on Nov. 14, 2017, now abandoned, and a continuation-in-part of application No. 15/806,697, filed on Nov. 8, 2017, now abandoned, said application No. 15/835,436 is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, said application No. 15/823,285 is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, said application No. 15/818,733 is a continuation-in-part of application No. 15/725,274, filed on Oct. 4, 2017, now Pat. No. 10,609,079, said application No. 15/823,363 is a continuation-in-part of application No. 15/725,274, filed on Oct. 4, 2017, now Pat. No. 10,609,079, said application No. 16/248,133 is a continuation-in-part of application No. 15/673,368, filed on Aug. 9, 2017, now abandoned, said application No. 15/725,274 is a continuation-in-part of application No. 15/655,113, filed on Jul. 20, 2017, now Pat. No. 10,735,456, said application No. 15/813,097 is a continuation-in-part of application No. 15/616,427, filed on Jun. 7, 2017, now abandoned, said application No. 15/655,113 is a continuation-in-part of application No. 15/616,427, filed on Jun. 7, 2017, now abandoned, said application No. 15/790,327 is a continuation-in-part of application No. 15/616,427, filed on Jun. 7, 2017, now abandoned, said application No. 15/787,601 is a continuation-in-part of application No. 15/616,427, filed on Jun. 7, 2017, now abandoned, said application No. 15/673,368 is a continuation-in-part of application No. 15/376,657, filed on Dec. 13, 2016, now Pat. No. 10,402,906, said application No. 15/806,697 is a continuation-in-part of application No. 15/376,657, filed on Dec. 13, 2016, now Pat. No. 10,402,906, and a continuation-in-part of application No. 15/343,209, filed on Nov. 4, 2016, now Pat. No. 11,087,403, said application No. 15/376,657 is a continuation-in-part of application No. 15/237,625, filed on Aug. 15, 2016, now Pat. No. 10,248,910, said application No. 15/655,113 is a continuation-in-part of application No. 15/237,625, filed on Aug. 15, 2016, now Pat. No. 10,248,910, said application No. 15/343,209 is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, said application No. 15/237,625 is a continuation-in-part of application No. 15/206,195, filed on Jul. 8, 2016, now abandoned, said application No. 15/229,476 is a continuation-in-part of application No. 15/206,195, filed on Jul. 8, 2016, now abandoned, which is a continuation-in-part of application No. 15/186,453, filed on Jun. 18, 2016, now abandoned, said application No. 15/835,312 is a continuation-in-part of application No. 15/186,453, filed on Jun. 18, 2016, now abandoned, which is a continuation-in-part of application No. 15/166,158, filed on May 26, 2016, now abandoned, said application No. 15/790,327 is a continuation-in-part of application No. 15/141,752, filed on Apr. 28, 2016, now Pat. No. 10,860,962, said application No. 15/166,158 is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, said application No. 15/616,427 is a continuation-in-part of application No. 14/925,974, filed on Oct. 28, 2015, now abandoned, said application No. 15/141,752 is a continuation-in-part of application No. 14/925,974, filed on Oct. 28, 2015, now abandoned.

(60) Provisional application No. 62/568,298, filed on Oct. 4, 2017, provisional application No. 62/568,312, filed on Oct. 4, 2017, provisional application No. 62/568,305, filed on Oct. 4, 2017, provisional application No. 62/568,291, filed on Oct. 4, 2017, provisional application No. 62/568,307, filed on Oct. 4, 2017.

(51) Int. Cl.
*G06F 16/951* (2019.01)
*H04L 41/149* (2022.01)

(52) U.S. Cl.
CPC ...... *H04L 63/1425* (2013.01); *H04L 63/1441* (2013.01); *H04L 63/20* (2013.01); *H04L 41/149* (2022.05)

(58) Field of Classification Search
CPC . H04L 67/34; H04L 63/1408; G06F 16/2477; G06F 16/951
See application file for complete search history.

(56) References Cited

U.S. PATENT DOCUMENTS

| | | | |
|---|---|---|---|
| 6,477,572 | B1 | 11/2002 | Elderton et al. |
| 7,072,863 | B1 | 7/2006 | Phillips et al. |
| 7,657,406 | B2 | 2/2010 | Tolone et al. |
| 7,698,213 | B2 | 4/2010 | Lancaster |
| 7,739,653 | B2 | 6/2010 | Venolia |
| 8,065,257 | B2 | 11/2011 | Kuecuekyan |
| 8,145,761 | B2 | 3/2012 | Liu et al. |
| 8,281,121 | B2 | 10/2012 | Nath et al. |
| 8,615,800 | B2 | 12/2013 | Baddour et al. |
| 8,788,306 | B2 | 7/2014 | Delurgio et al. |
| 8,793,758 | B2 | 7/2014 | Raleigh et al. |
| 8,914,878 | B2 | 12/2014 | Burns et al. |
| 8,997,233 | B2 | 3/2015 | Green et al. |
| 9,134,966 | B2 | 9/2015 | Brock et al. |
| 9,141,360 | B1 | 9/2015 | Chen et al. |
| 9,231,962 | B1 | 1/2016 | Yen et al. |
| 9,602,530 | B2 | 3/2017 | Ellis et al. |
| 9,654,495 | B2 | 5/2017 | Hubbard et al. |
| 9,672,355 | B2 | 6/2017 | Titonis et al. |
| 9,686,308 | B1 | 6/2017 | Srivastava |
| 9,762,443 | B2 | 9/2017 | Dickey |
| 9,887,933 | B2 | 2/2018 | Lawrence, III |
| 9,946,517 | B2 | 4/2018 | Talby et al. |
| 10,061,635 | B2 | 8/2018 | Ellwein |
| 10,102,480 | B2 | 10/2018 | Dirac et al. |
| 10,210,246 | B2 | 2/2019 | Stojanovic et al. |
| 10,210,255 | B2 | 2/2019 | Crabtree et al. |
| 10,242,406 | B2 | 3/2019 | Kumar et al. |
| 10,248,910 | B2 | 4/2019 | Crabtree et al. |
| 10,318,882 | B2 | 6/2019 | Brueckner et al. |
| 10,367,829 | B2 | 7/2019 | Huang et al. |
| 10,511,498 | B1 | 12/2019 | Narayan et al. |
| 11,392,422 | B1* | 7/2022 | Filiz ................ G06F 9/45558 |
| 2003/0041254 | A1 | 2/2003 | Challener et al. |
| 2003/0145225 | A1 | 7/2003 | Bruton et al. |
| 2004/0030775 | A1* | 2/2004 | Lauzon .............. H04L 67/56 709/224 |
| 2005/0289072 | A1 | 12/2005 | Sabharwal |
| 2006/0149575 | A1 | 7/2006 | Varadarajan et al. |
| 2007/0150744 | A1 | 6/2007 | Cheng et al. |
| 2008/0034036 | A1* | 2/2008 | Takeshima .............. G06F 16/95 707/E17.107 |
| 2009/0064088 | A1 | 3/2009 | Barcia et al. |
| 2009/0089227 | A1 | 4/2009 | Sturrock et al. |
| 2009/0182672 | A1 | 7/2009 | Doyle |
| 2009/0222562 | A1 | 9/2009 | Liu et al. |
| 2009/0293128 | A1 | 11/2009 | Lippmann et al. |
| 2011/0060821 | A1 | 3/2011 | Loizeaux et al. |
| 2011/0087888 | A1 | 4/2011 | Rennie |
| 2011/0154341 | A1 | 6/2011 | Pueyo et al. |
| 2012/0266244 | A1 | 10/2012 | Green et al. |
| 2013/0073062 | A1 | 3/2013 | Smith et al. |
| 2013/0132149 | A1 | 5/2013 | Wei et al. |
| 2013/0191416 | A1 | 7/2013 | Lee et al. |
| 2013/0246996 | A1 | 9/2013 | Duggal et al. |
| 2013/0304623 | A1 | 11/2013 | Kumar et al. |
| 2014/0046691 | A1* | 2/2014 | Malec ................... G06Q 10/10 705/3 |
| 2014/0156806 | A1 | 6/2014 | Karpistsenko et al. |
| 2014/0244612 | A1 | 8/2014 | Bhasin et al. |
| 2014/0279762 | A1 | 9/2014 | Kaypanya et al. |
| 2015/0149979 | A1 | 5/2015 | Talby et al. |
| 2015/0163242 | A1 | 6/2015 | Laidlaw et al. |
| 2015/0169294 | A1 | 6/2015 | Brock et al. |
| 2015/0195192 | A1 | 7/2015 | Vasseur et al. |
| 2015/0236935 | A1 | 8/2015 | Bassett |
| 2015/0281225 | A1 | 10/2015 | Schoen et al. |
| 2015/0317481 | A1 | 11/2015 | Gardner et al. |
| 2015/0339263 | A1 | 11/2015 | Ata et al. |
| 2015/0347414 | A1 | 12/2015 | Xiao et al. |
| 2015/0379424 | A1 | 12/2015 | Dirac et al. |
| 2016/0004858 | A1 | 1/2016 | Chen et al. |
| 2016/0028758 | A1 | 1/2016 | Ellis et al. |
| 2016/0072845 | A1 | 3/2016 | Chiviendacz et al. |
| 2016/0078361 | A1 | 3/2016 | Brueckner et al. |
| 2016/0099960 | A1 | 4/2016 | Gerritz et al. |
| 2016/0105454 | A1 | 4/2016 | Li et al. |
| 2016/0140519 | A1 | 5/2016 | Trepca et al. |
| 2016/0275123 | A1 | 9/2016 | Lin et al. |
| 2016/0285732 | A1 | 9/2016 | Brech et al. |
| 2016/0342606 | A1 | 11/2016 | Mouel et al. |
| 2016/0350442 | A1 | 12/2016 | Crosby |
| 2016/0364307 | A1 | 12/2016 | Garg et al. |
| 2017/0019678 | A1 | 1/2017 | Kim et al. |
| 2017/0063896 | A1 | 3/2017 | Muddu et al. |
| 2017/0083380 | A1 | 3/2017 | Bishop et al. |
| 2017/0126712 | A1 | 5/2017 | Crabtree et al. |
| 2017/0139763 | A1 | 5/2017 | Ellwein |
| 2017/0149802 | A1 | 5/2017 | Huang et al. |
| 2017/0193110 | A1 | 7/2017 | Crabtree et al. |
| 2017/0206360 | A1 | 7/2017 | Brucker et al. |
| 2017/0322959 | A1 | 11/2017 | Tidwell et al. |
| 2017/0323089 | A1 | 11/2017 | Duggal et al. |
| 2018/0053328 | A1* | 2/2018 | Simonovic ............ G06T 11/206 |
| 2018/0197128 | A1 | 7/2018 | Carstens et al. |
| 2018/0300930 | A1 | 10/2018 | Kennedy et al. |
| 2019/0082305 | A1 | 3/2019 | Proctor |
| 2019/0095533 | A1 | 3/2019 | Levine et al. |
| 2020/0076772 | A1* | 3/2020 | Kapp ................. H04L 63/0407 |
| 2020/0241962 | A1* | 7/2020 | Dain .................. G06F 16/1748 |
| 2020/0404082 | A1* | 12/2020 | Shcherbakov .......... H04L 67/10 |

* cited by examiner

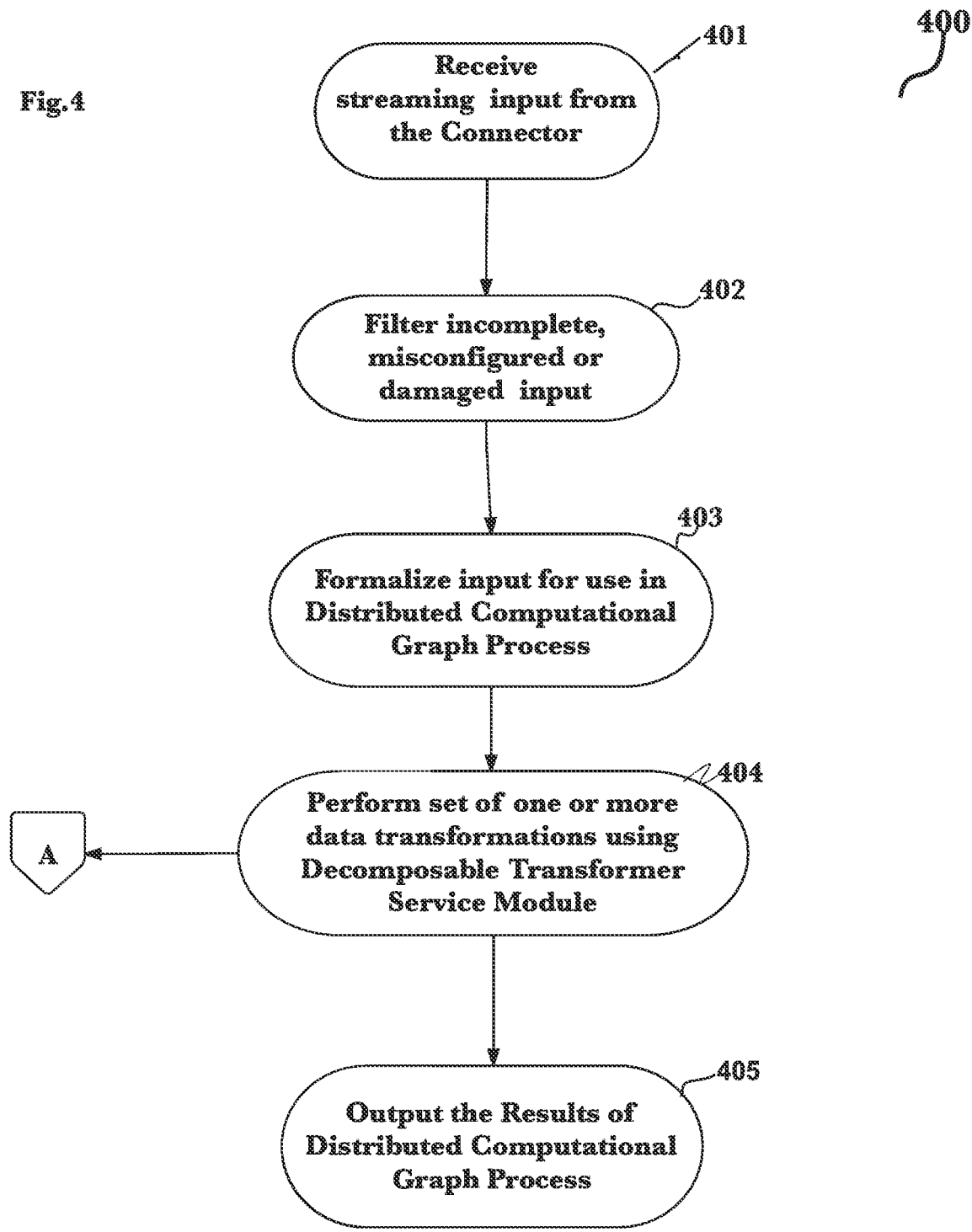

Service Configuration for Service A
1400

Authentication information:
Username: admin@servicea.com
Password: ****************

Access information:
def get_data():
    api_url = antivirus.com/api/customer/servicea
    request_data = requests.get(api_url)
    return request_data.json()

Processing tag information:
<HIPAA>
<GDPR>

Fig. 14

SYSTEM AND METHOD FOR AGGREGATING AND SECURING MANAGED DETECTION AND RESPONSE CONNECTION INTERFACES BETWEEN MULTIPLE NETWORKED SOURCES

CROSS-REFERENCE TO RELATED APPLICATIONS

Priority is claimed in the application data sheet to the following patents or patent applications, the entire written description, including figures, of each of which is expressly incorporated herein by reference in its entirety:

Ser. No. 17/074,882
Ser. No. 17/035,029
Ser. No. 17/008,276
Ser. No. 17/000,504
Ser. No. 16/855,724
Ser. No. 16/836,717
Ser. No. 15/887,496
Ser. No. 15/823,285
Ser. No. 15/788,718
Ser. No. 15/788,002
Ser. No. 15/787,601
62/568,312
Ser. No. 15/616,427
Ser. No. 14/925,974
62/568,305
62/568,307
Ser. No. 15/818,733
Ser. No. 15/725,274
Ser. No. 15/655,113
Ser. No. 15/616,427
Ser. No. 15/237,625
Ser. No. 15/206,195
Ser. No. 15/186,453
Ser. No. 15/166,158
Ser. No. 15/141,752
Ser. No. 15/091,563
Ser. No. 14/925,974
Ser. No. 16/777,270
Ser. No. 16/720,383
Ser. No. 15/823,363
Ser. No. 15/725,274
Ser. No. 16/412,340
Ser. No. 16/267,893
Ser. No. 16/248,133
Ser. No. 15/849,901
Ser. No. 15/835,436
Ser. No. 15/790,457
Ser. No. 15/790,327
62/568,291
Ser. No. 15/616,427
Ser. No. 15/141,752
62/568,298
Ser. No. 15/835,312
Ser. No. 15/186,453
Ser. No. 15/813,097
Ser. No. 15/616,427
Ser. No. 15/806,697
Ser. No. 15/376,657
Ser. No. 15/237,625
Ser. No. 15/343,209
Ser. No. 15/237,625
Ser. No. 15/299,476
Ser. No. 15/206,195
Ser. No. 15/673,368
Ser. No. 15/376,657

BACKGROUND OF THE INVENTION

Field of the Invention

The present invention is in the field of computer systems, and more specifically, the field of cybersecurity and cloud-based computer services.

Discussion of the State of the Art

It is not news that today's battlefields extend into cyberspace. The players are domestic, foreign, military, civilian and everything in-between. Additionally, a player's motivations are as varied as are the players themselves. This battlefield is a constant front for businesses, where more than two-thirds of all businesses have experienced some form of data breach and cybersecurity attack in the past few years. Sophisticated cyber adversaries access and disrupt business networks, but at least two-thirds of businesses do not have the capital or on-site expertise to secure and defend their networks.

Some managed detection & response offerings (MDR) have attempted to rise to the challenges stated above, but each have a fatal flaw; each are forced to log in to separate instances of each of their customers' SIEMs in order to provide managed security services. This method cannot guarantee compartmentalization of customers in the event of an MDR data breach and may actually be providing numerous vectors of attack. Strict data isolation guarantees need to exist when servicing many customers' sensitive cybersecurity telemetry and resulting analytics.

What is needed is a flexible and high-speed Managed Detection and Response platform that ingests, parses, normalizes, monitors, and correlates nearly any log source and security tool output while facilitating data isolation, proper handling, and provenance across multiple customers and security products.

SUMMARY OF THE INVENTION

Accordingly, the inventor has developed and reduced to practice, a system and method for a flexible, high-speed Managed Detection and Response platform that ingests, parses, normalizes, monitors, and correlates nearly any log source or security tool output. The MDR comprising of a declarative connector service that tags events with appropriate data source labels to facilitating data isolation, proper handling, and provenance across multiple customers and security products but otherwise aggregate alerts into a single data stream for consumption by the MDR SOC operators. A connector service further provides a programmatic (API-based) means to interchange data securely across environments. Event data is aggregated by the Managed Detection and Response platform that then utilizes enhanced log ingest capabilities to process the data allowing SOC operators to be able to write rules against the alerts.

According to a preferred embodiment of the invention, a system for facilitating data isolation, proper handling, and provenance across multiple entities and security products is disclosed, comprising: a computing device comprising a memory, a processor, and a non-volatile data storage device; a connector interface service comprising a first plurality of programming instructions stored in the memory of, and operating on the processor of, the computing device, wherein the first plurality of programming instructions, when operating on the processor, cause the computing device to: receive a service configuration, wherein the service configuration comprises authentication information, access information, and processing information; store the service configuration in the non-volatile data storage device; retrieve data from a service using at least the authentication and the access information in the service configuration, wherein the retrieved data comprises computing and networking events; embed a tag to each event according to the respective processing information; organize the retrieved and tagged data into a single data stream; encrypt the single data stream; and send the encrypted data stream comprising tagged data over a network to a secure processing facility.

According to a second preferred embodiment, a method for facilitating data isolation, proper handling, and provenance across multiple entities and security products is disclosed, comprising the steps of: receiving a service configuration, wherein the service configuration comprises authentication information, access information, and processing information; storing the service configuration in a non-volatile data storage device; retrieving data from a service using at least the authentication and the access information in the service configuration, wherein the retrieved data comprises computing and networking events; embedding a tag to each event according to the respective processing information; organizing the retrieved and tagged data into a single data stream; encrypting die single data stream; and sending the encrypted data stream comprising tagged data over a network to a secure processing facility.

According to various aspects; wherein the tag further comprises data provenance information; wherein the computing device is comprised of multiple computers forming a distributed system; wherein the retrieval of data from more than one service is accomplished via a connector workflow configuration; wherein the connector workflow configuration is a data processing workflow generated from a distributed computational graph module; wherein the data exchange between the service, the connector interface service, and the secure processing facility is performed using a RESTful API that facilitates data exchange between and among cloud-based services.

BRIEF DESCRIPTION OF THE DRAWING FIGURES

The accompanying drawings illustrate several aspects and, together with the description, serve to explain the principles of the invention according to the aspects. IL will be appreciated by one skilled in the art that the particular arrangements illustrated in the drawings are merely exemplary and are not to be considered as limiting of the scope of the invention or the claims herein in any way.

FIG. 4 is a process flow diagram of a method for the receipt, processing and predictive analysis of streaming data using a system of the invention.

FIG. 14 is an exemplary simplified service configuration example using an API, according to one aspect.

DETAILED DESCRIPTION

Figure 1:
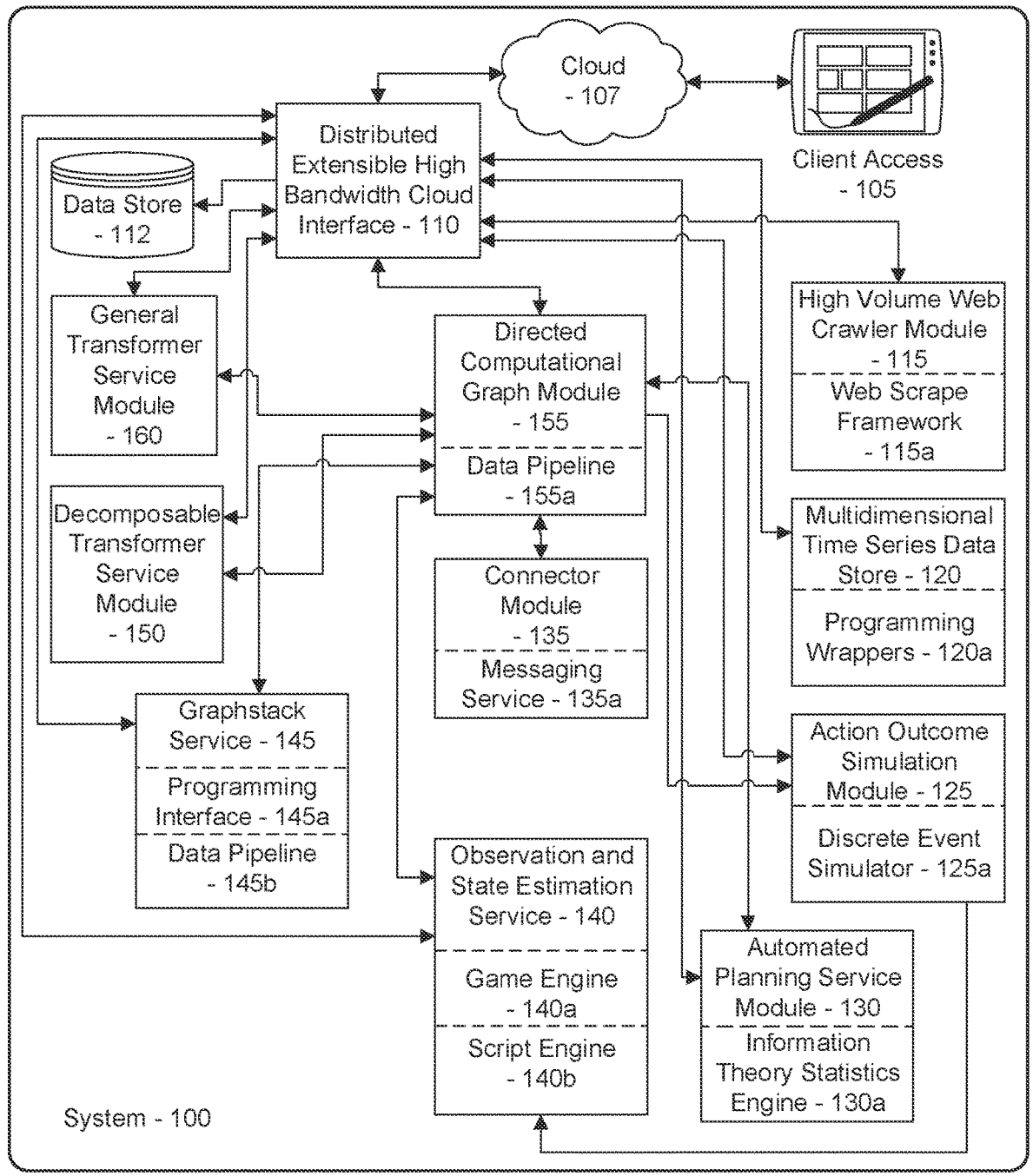
FIG. 1 is a block diagram of an exemplary system architecture for an advanced cyber decision platform.

Accordingly, the inventor has developed and reduced to practice a system and method for a flexible, high-speed Managed Detection and Response platform that ingests, parses, normalizes, monitors, and correlates nearly any log source or security tool output. The MDR comprising of a declarative connector service that tags events with appropriate data source labels (to facilitate data isolation and proper handling) but otherwise aggregate alerts into a single data stream for consumption by the MDR SOC operators. A connector service further provides a programmatic (API-based) means to interchange data securely across environments. Event data is aggregated by the Managed Detection and Response platform that then utilizes enhanced log ingest capabilities to process the data allowing SOC operators to be able to write rules against the alerts.

The connection interface is an enterprise service bus that processes connector workflows by managing a cluster of network resources to capture data from and transfer data between and among network service sources. A connector interface using load-balancing clusters is able to provision and distribute multiple execution processes across duster nodes for the same connector workflow, allowing for horizontal scaling of the connector workflow. Clusters also improve system performance and scalability by providing fault tolerance in the event that of a malfunctioning cluster node. An event tagger tags data so that it may be read on the distant end according to proper data isolation and proper handling regulations. The system may be able to restart a process, using previous cluster core stale information that is persisted by the main workflow node achieving idempotence for processing, an important characteristic of distributed fault-tolerant systems. Load-balancing clusters are configurations in which cluster nodes share a computational workload to provide better overall performance. For example, the connector interface cluster may assign different messages to different nodes, so the overall response time will be optimized. Using this approach, how much the connector interface needs to scale is simply driven by business requirements as the connector cluster allows for more precise control of how computing resources are used. The operations of a load-balancing workflows across a cluster as well as scaling the cluster itself are automated using a container orchestration service, for example Kubernetes™ may be selected as the container service, according to an embodiment. Additionally, the clusters aggregate a plurality of data from a plurality of data sources into a single encrypted data stream.

According to an embodiment, the system can be used as a universal data connection interface for network and cloud-based services. For example, if a user has cloud-based accounts at Twitter™, Slack™, and Google™ cloud-based service providers, die user can set up connectors between the accounts using a distributed computational graph such that all of the configuration information from Twitter™, Slack™, and Google™ is shown in a single interface with a common format. The system takes care of retrieving and formatting the data for the user's use, and takes care of reformatting, uploading, and coordination of data among die cloud-based services if die user makes changes. As an example, if the user changes a password in one cloud-based service all the automated tasks relying on that cloud-based service using the old password are halted until the service is reconfigured. The connector service automatically finds and updates the other two cloud-based services' API keys to function with the new password. As another example, consider a connection between the above mentioned cloud-based services that takes Google™ search queries, sends the query data to Twitter™ to find the most ten most retweeted tweets that are related to the search query data, and then posts die ten tweets in a Slack™ channel related to the search query data. If instead, the system user wanted to use the search query data to find die ten most liked tweets that are related to the search query, a simple configuration change would be automatically applied to the cloud-based services and the intermediate transformation steps to ensure that the data is in the correct format.

One or more different aspects may be described in the present application. Further, for one or more of die aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

"Workflow" or "connector workflow" as used herein means an orchestrated pattern of data processing activities. Connector workflows may comprise a variety of plugins each of which is related to a cloud-based network service. Each plugin can be categorized into one of the three following components, an input stage, a transformation stage, and an output stage. An input component may listen for specific data messages that enter a message queue and then pass the message to the next component. A transformation component changes the format of the data message in some form. These transformations are generally executed as filters that route the data message dependent upon the filter configuration. An output component receives a data message and either stores the message for future use, or executes a function of the cloud-based network service. A connector workflow may be selected from a list of predefined, built in workflows, or it may be custom built and can be composed of an arbitrary number of input stages, transformation stages, and output stages to allow generalizable data exchange and transformation. Furthermore, each workflow may be configured, using predefined or custom built configurations, to perform a variety of data processing tasks to suit a business' needs.

Conceptual Architecture

FIG. 1 is a block diagram of an advanced cyber decision platform. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information via network 107 and operates a data store 112 such as, but not limited to MONGODB™, COUCHDB™, CASSANDRA™ or REDIS™ according to various arrangements. Much of the business data analyzed by the system both from sources within the confines of the client business, and from cloud based sources, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database (MDTSDB) 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within die directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of die graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension tune series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers 120a for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database (MDTSDB) 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

When performing external reconnaissance via a network 107, web crawler 115 may be used to perform a variety of port and service scanning operations on a plurality of hosts. This may be used to target individual network hosts (for example, to examine a specific server or client device) or to broadly scan any number of hosts (such as all hosts within a particular domain, or any number of hosts up to the complete IPv4 address space). Port scanning is primarily used for gathering information about hosts and services connected to a network, using probe messages sent to hosts that prompt a response from that host. Port scanning is generally centered around the transmission control protocol (TCP), and using the information provided in a prompted response a port scan can provide information about network and application layers on the targeted host.

Port scan results can yield information on open, closed, or undetermined ports on a target host. An open port indicated that an application or service is accepting connections on this port (such as ports used for receiving customer web traffic on a web server), and these ports generally disclose the greatest quantity of useful information about the host. A closed port indicates that no application or service is listening for connections on that port, and still provides information about the host such as revealing the operating system of the host, which may discovered by fingerprinting the TCP/IP stack in a response. Different operating systems exhibit identifiable behaviors when populating TCP fields, and collecting multiple responses and matching the fields against a database of known fingerprints makes it possible to determine the OS of the host even when no ports are open. An undetermined port is one that does not produce a requested response, generally because the port is being filtered by a firewall on the host or between the host and the network (for example, a corporate firewall behind which all internal servers operate).

Scanning may be defined by scope to limit the scan according to two dimensions, hosts and ports. A horizontal scan checks the same port on multiple hosts, often used by attackers to check for an open port on any available hosts to select a target for an attack that exploits a vulnerability using that port. This type of scan is also useful for security audits, to ensure that vulnerabilities are not exposed on any of the target hosts. A vertical scan defines multiple ports to examine on a single host, for example a "vanilla scan" which targets every port of a single host, or a "strobe scan" that targets a small subset of ports on the host. This type of scan is usually performed for vulnerability detection on single systems, and due to the single-host nature is impractical for large network scans. A block scan combines elements of both horizontal and vertical scanning, to scan multiple ports on multiple hosts. This type of scan is useful for a variety of service discovery and data collection tasks, as it allows a broad scan of many hosts (up to the entire Internet, using the complete IPv4 address space) for a number of desired ports in a single sweep.

Large port scans involve quantitative research, and as such may be treated as experimental scientific measurement and are subject to measurement and quality standards to ensure the usefulness of results. To avoid observational errors during measurement, results must be precise (describing a degree of relative proximity between individual measured values), accurate (describing relative proximity of measured values to a reference value), preserve any metadata that accompanies the measured data, avoid misinterpretation of data due to faulty measurement execution, and must be well-calibrated to efficiently expose and address issues of inaccuracy or misinterpretation. In addition to these basic requirements, large volumes of data may lead to unexpected behavior of analysis tools, and extracting a subset to perform initial analysis may help to provide an initial overview before working with the complete data set. Analysis should also be reproducible, as with all experimental science, and should incorporate publicly-available data to add value to the comprehensibility of the research as well as contributing to a "common framework" that may be used to confirm results.

When performing a port scan, web crawler 115 may employ a variety of software suitable for the task, such as Nmap, ZMap, or masscan. Nmap is suitable for large scans as well as scanning individual hosts, and excels in offering a variety of diverse scanning techniques. ZMap is a newer application and unlike Nmap (which is more general-purpose), ZMap is designed specifically with Internet-wide scans as the intent. As a result, ZMap is far less customizable and relies on horizontal port scans for functionality, achieving fast scan times using techniques of probe randomization (randomizing the order in which probes are sent to hosts, minimizing network saturation) and asynchronous design (utilizing stateless operation to send and receive packets in separate processing threads). Masscan uses the same asynchronous operation model of ZMap, as well as probe randomization. In masscan however, a certain degree of statistical randomness is sacrificed to improve computation time for large scans (such as when scanning the entire IPv4 address space), using the BlackRock algorithm. This is a modified implementation of symmetric encryption algorithm DES, with fewer rounds and modulo operations in place of binary ones to allow for arbitrary ranges and achieve faster computation time for large data sets.

Received scan responses may be collected and processed through a plurality of data pipelines 155a to analyze the collected information. MDTSDB 120 and graph stack 145 may be used to produce a hybrid graph/time-series database using the analyzed data, forming a graph of Internet-accessible organization resources and their evolving state information over time. Customer-specific profiling and scanning information may be linked to CPG graphs (as described below in detail, referring to FIG. 19) for a particular customer, but this information may be further linked to the base-level graph of internet-accessible resources and information. Depending on customer authorizations and legal or regulatory restrictions and authorizations, techniques used may involve both passive, semi-passive and active scanning and reconnaissance.

Figure 2:
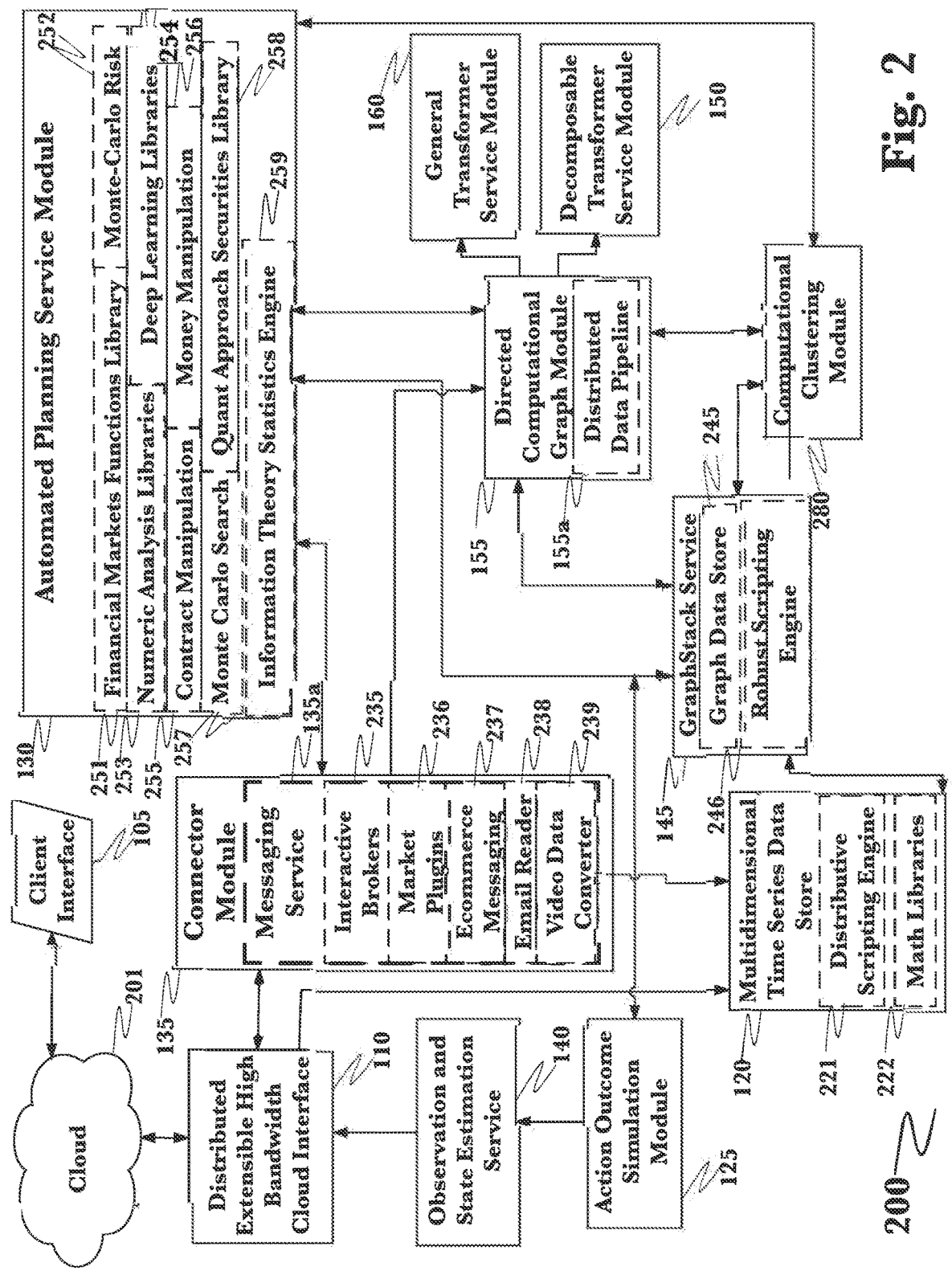
FIG. 2 is a block diagram of an advanced cyber decision platform in an exemplary configuration for use in investment vehicle management.

FIG. 2 is a block diagram of an advanced cyber decision platform in an exemplary configuration for use in investment vehicle management 200. The advanced cyber decision platform 100 previously disclosed in co-pending application Ser. No. 15/141,752 and applied in a role of cybersecurity in co-pending application Ser. No. 15/237,625, when programmed to operate as quantitative trading decision platform, is very well suited to perform advanced predictive analytics and predictive simulations 202 to produce investment predictions. Much of the trading specific programming functions are added to the automated planning service module 130 of the modified advanced cyber decision platform 100 to specialize it to perform trading analytics. Specialized purpose libraries may include but are not limited to financial markets functions libraries 251, Monte-Carlo risk routines 252, numeric analysis libraries 253, deep learning libraries 254, contract manipulation functions 255, money handling functions 256, Monte-Carlo search libraries 257, and quant approach securities routines 258. Pre-existing deep learning routines including information theory statistics engine 259 may also be used. The invention may also make use of other libraries and capabilities that are known to those skilled in the art as instrumental in the regulated trade of items of worth. Data from a plurality of sources used in trade analysis are retrieved, much of it from remote, cloud resident 201 servers through the system's distributed, extensible high bandwidth cloud interface 110 using the system's connector module 135 which is specifically designed to accept data from a number of information services both public and private through interfaces to those service's applications using its messaging service 135a routines, due to ease of programming, are augmented with interactive broker functions 235, market data source plugins 236, e-commerce messaging interpreters 237, business-practice aware email reader 238 and programming libraries to extract information from video data sources 239.

Other modules that make up the advanced cyber decision platform may also perform significant analytical transformations on trade related data. These may include the multidimensional time series data store 120 with its robust scripting features which may include a distributive friendly, fault-tolerant, real-time, continuous run prioritizing, programming platform such as, but not limited to Erlang/OTP 221 and a compatible but comprehensive and proven library of math functions of which the C++ math libraries are an example 222, data formalization and ability to capture time series data including irregularly transmitted, burst data; the GraphStack service 145 which transforms data into graphical representations for relational analysis and may use packages for graph format data storage such as Titan 245 or the like and a highly interface accessible programming interface an example of which may be Akka/Spray, although other, similar, combinations may equally serve the same purpose in this role 246 to facilitate optimal data handling; the directed computational graph module 155 and its distributed data pipeline 155a supplying related general transformer service module 160 and decomposable transformer module 150 which may efficiently carry out linear, branched, and recursive transformation pipelines during trading data analysis may be programmed with multiple trade related functions involved in predictive analytics of the received trade data. Both possibly during and following predictive analyses carried out by the system, results must be presented to clients 105 in formats best suited to convey the both important results for analysts to make highly informed decisions and, when needed, interim or final data in summary and potentially raw for direct human analysis. Simulations which may use data from a plurality of field spanning sources to predict future trade conditions these are accomplished within the action outcome simulation module 125. Data and simulation formatting may be completed or performed by the observation and state estimation service 140 using its ease of scripting and gaming engine to produce optimal presentation results.

In cases where there are both large amounts of data to be cleansed and formalized and then intricate transformations such as those that may be associated with deep machine learning, first disclosed in ¶067 of application Ser. No. 14/925,974, predictive analytics and predictive simulations, distribution of computer resources to a plurality of systems may be routinely required to accomplish these tasks due to the volume of data being handled and acted upon. The advanced cyber decision platform employs a distributed architecture that is highly extensible to meet these needs. A number of the tasks carried out by the system are extremely processor intensive and for these, the highly integrated process of hardware clustering of systems, possibly of a specific hardware architecture particularly suited to the calculations inherent in the task, is desirable, if not required for timely completion. The system includes a computational clustering module 280 to allow the configuration and management of such clusters during application of the advanced cyber decision platform. While the computational clustering module is drawn directly connected to specific co-modules of the advanced cyber decision platform these connections, while logical, are for ease of illustration and those skilled in the art will realize that the functions attributed to specific modules of an embodiment may require clustered computing under one use case and not under others. Similarly, the functions designated to a clustered configuration may be role, if not run, dictated. Further, not all use cases or data runs may use clustering.

Figure 3A:
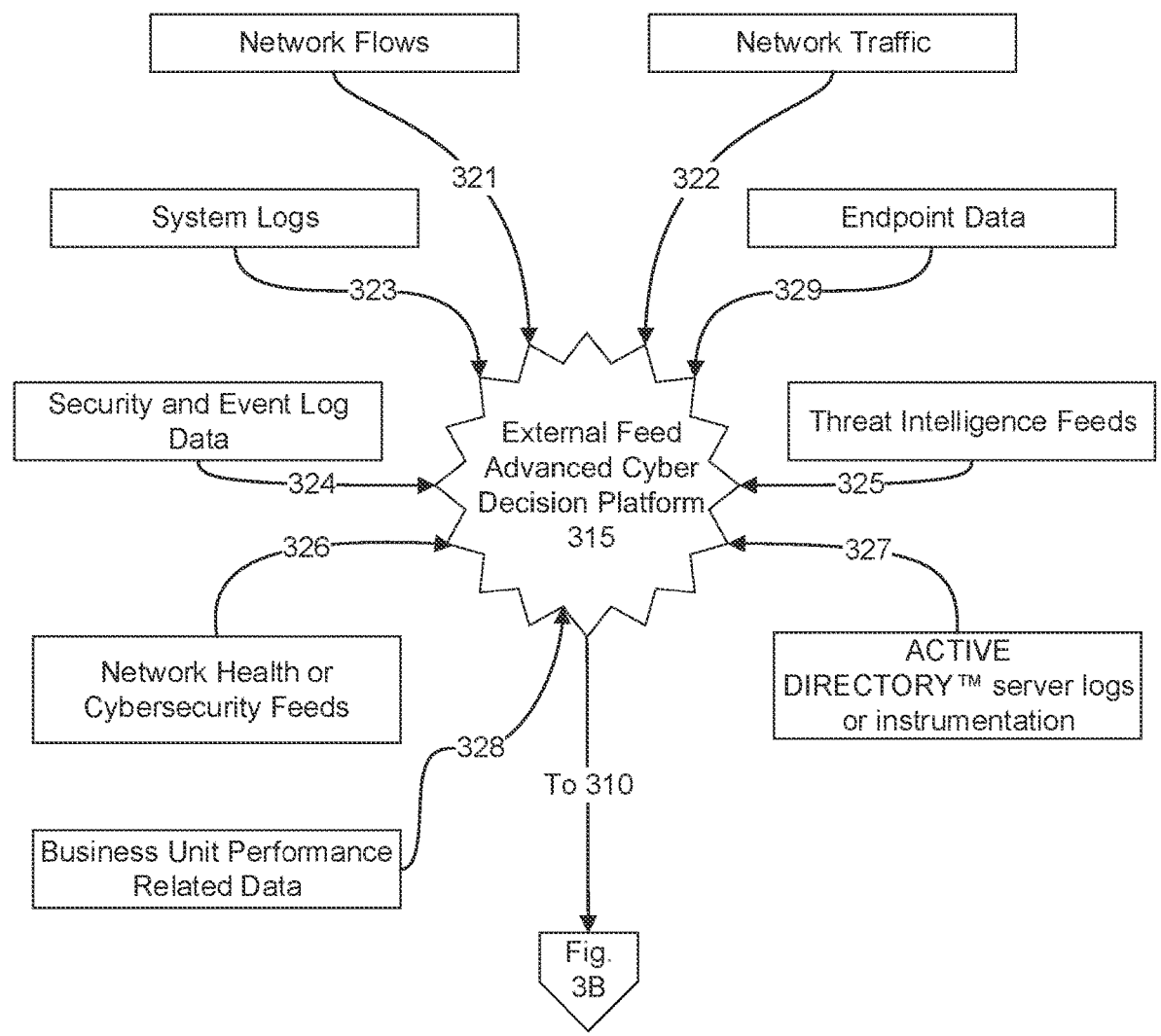
FIGS. 3A and 3B are process diagrams showing further detail regarding the operation of the advanced cyber decision platform.
Figure 3B:
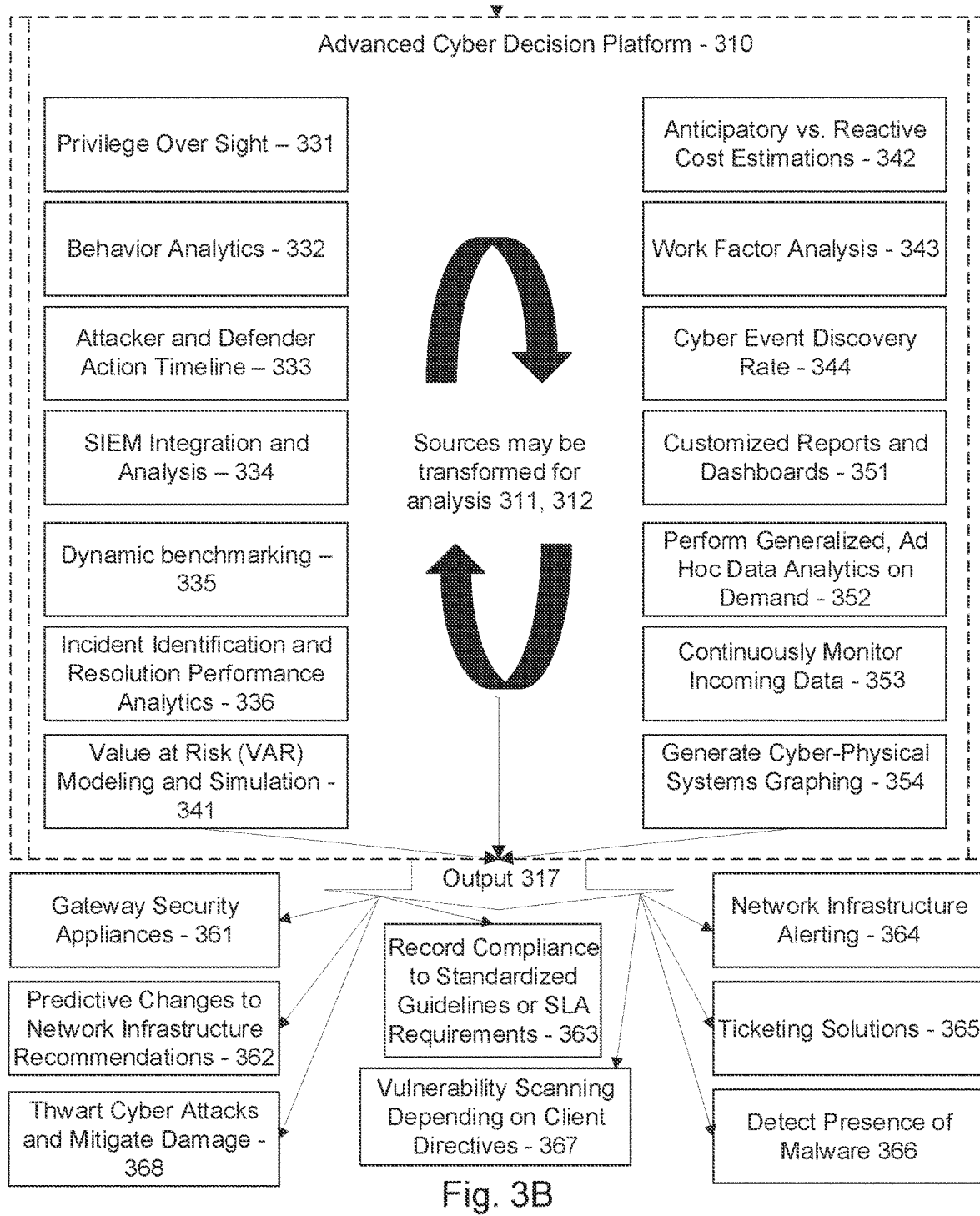

FIGS. 3A and 3B are process diagrams showing further detail regarding the operation of the advanced cyber decision platform. Input network data which may include network flow patterns 321, the origin and destination of each piece of measurable network traffic 322, system logs from servers and workstations on the network 323, endpoint data 329, any security event log data from servers or available security information and event (SIEM) systems 324, external threat intelligence feeds 324, identity or assessment context 325, external network health or cybersecurity feeds 326, Kerberos domain controller or ACTIVE DIRECTORY™, server logs or instrumentation 327, business unit performance related data 328, endpoint data 329, among many other possible data types for which the invention was designed to analyze and integrate, may pass into 315 the advanced cyber decision platform 310 for analysis as part of its cyber security function. These multiple types of data from a plurality of sources may be transformed for analysis 311, 312 using at least one of the specialized cybersecurity, risk assessment or common functions of the advanced cyber decision platform in the role of cybersecurity system, such as, but not limited to network and system user privilege oversight 331, network and system user behavior analytics 332, attacker and defender action timeline 333, SIEM integration and analysis 334, dynamic benchmarking 335, and incident identification and resolution performance analytics 336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the advanced cyber decision platform's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 362, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, perform one time or continuous vulnerability scanning depending on client directives 367, and thwart or mitigate damage from cyber-attacks 368. These examples are, of course, only a subset of the possible uses of the system, they are exemplary in nature and do not reflect any boundaries in the capabilities of the invention.

Figure 8:
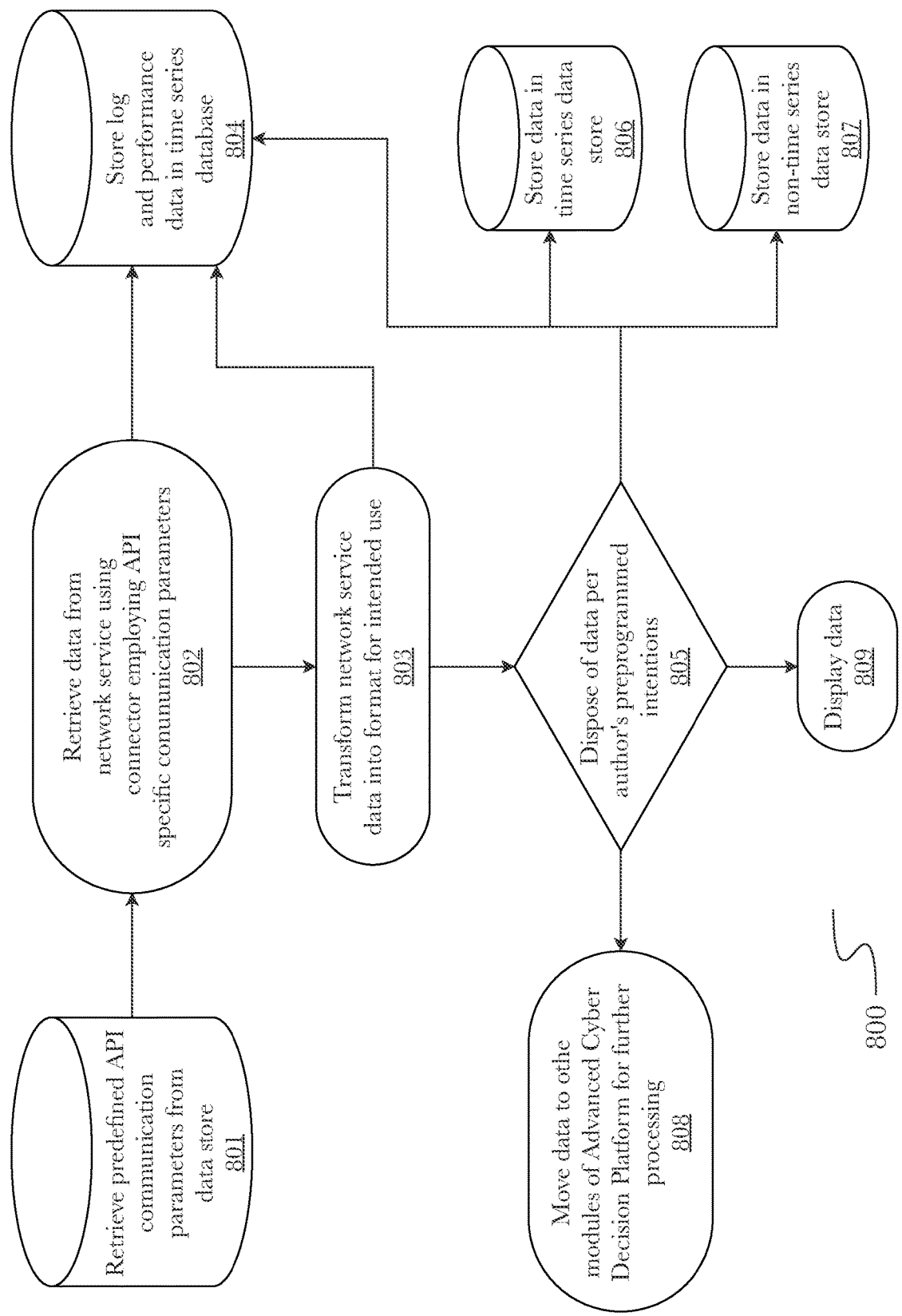
FIG. 8 is a flow diagram of the operation of an exemplary connector module according to an embodiment of the invention.

FIG. 8 is a flow diagram of the operation of an exemplary connector module according to an embodiment of the invention 800. Information from a plurality of network or cloud based service source which may include but are not limited to SALESFORCE™, BLOOMBERG™, THOMSON-REUTERS™, TWITTER™, FACEBOOK™, and GOOGLE™ using a connector module 135 specifically designed for the task 802. The connector module may store and retrieve API routines for the network services from which the desired information is retrieved as well as other parameters such as any security or subscription credentials, among other task related information from one or more databases in a data store 801. Retrieval may occur by passive monitoring of a network service's published data stream as may be the case for sources such as news providers or investment market tickers, to name a few such streaming sources known to those skilled in die art as important to business intelligence and operations through the use of predefined filters. Alternatively, retrieval may occur from a subset of network service sources on the basis of a pre-decided and pre-scripted triggering event of set of triggering events or on a timed interval trigger where the source may be polled for new information either at specific timed intervals or at specific times of the day. Other triggers for information retrieval may be known to those skilled in the art and do to robust, expressive python based scripting language designed into the connector module 135, the invention may be configured to employ any such strategy that can be programmed into a computing device.

Invoking scripts to be employed for specific triggers, time based or event based is simplified by the use of separate parameter files a sample template of which is shown:

```
01 "triggers": [
02   {
03     "uuid": "abscefg",
04     "name": "trigger-name",
05     "type": "time OR event",
06     "condition": [
07       "name": "condition-name",
08       "description": "condition-description",
09       "pythonToEvaluate": "function which returns a boolean when specified input is provided"
10       "pythonToFormatOutputForAction": "function to process available data/state information into action format"
11     ]
12     "action": "123456",
13   }
```

Of special note in the above listing are line 10 where, based upon the trigger, specific formatting may be performed on the incoming data prior to that data being routed to another module in the system 100 for possible further processing or display, and line 12 where the next action to be performed, most likely by another module of the advanced cyber decision platform such as, but not limited to the digital computational graph module 155 and decomposable transformer service module 150 803, the multidimensional time series data store 120, display at a client access terminal 105 or persistent storage in a data store (not shown). Actions brought about by combinations of these and other system modules as also possible 805. While other business system modules may participate in the processing of information retrieved by the connector module 200, 802, Much of the data modification done 803 may require the transformative capabilities of the decomposable transformer service module 150, which is accessed through distributed computational graph module 155, 400. The decomposable transformer service module 150 may be employed in these instances because it is able to perform complex series transformation pathways which may be simple linear, branching, two sources into one output, and reiterative. The nature of transformations done, for example, aggregation or audio to text translation are completely dependent on the intended downstream usage of that data with coding for each transformation pre-programmed and pre-selected for those purposes. Transformed data may then follow one of several paths to useful disposition which non-exhaustively includes passing the data to other modules of the advanced cyber decision platform 100, 808, displaying the data in tabular of graphical formats 809, or storing the data in a data store most suited to the type of data received 806, 807. Other activities performed by the connector module such as, but not limited to simple data aggregation and output formatting and routing are controlled by the same easily generated and maintained parameter lists and underlying PYTHON™ based scripts as listed above. It should be noted that, while PYTHON™ is currently used as the underlying scripting language, the invention is not reliant upon any specific language to fulfill this purpose and any similar scripting language known to those skilled in the art may be used in its place as utility warrants. Last, each retrieval and processing step, as well as supporting system activities as well as performance data, which may be involved in SLA standards compliance may be stored in the multidimensional time series data store 804, 120 either for metric or analytical monitoring transmission or later inspection during troubleshooting or metric review at a later time.

FIG. 4 is a process flow diagram of a method 400 for predictive analysis of very large data sets using the decomposable transformation service module. One or more streams of data from a plurality of sources, which includes, but is in no way not limited to, the connector module 135, 200 of the advanced cyber decision platform 100, a number of physical sensors, web based questionnaires and surveys, monitoring of electronic infrastructure, crowd sourcing campaigns, and direct human interaction, may be received by system 401. The received stream is filtered 402 to exclude data that has been corrupted, data that is incomplete or misconfigured and therefore unusable, data that may be intact but nonsensical within the context of the analyses being run, as well as a plurality of predetermined analysis related and unrelated criteria set by the authors. Filtered data may be split into two identical streams at this point (second stream not depicted for simplicity), wherein one substream may be sent for batch processing while another substream may be formalized 403 for transformation pipeline analysis 404. Data formalization for transformation pipeline analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The formalized data stream may be subjected to one or more transformations. Each transformation acts as a function on the data and may or may not change the data. Within the invention, transformations working on the same data stream where the output of one transformation acts as the input to the next are represented as transformation pipelines. While the great majority of transformations in transformation pipelines receive a single stream of input, modify the data within the stream in some way and then pass the modified data as output to the next transformation in the pipeline, the invention does not require these characteristics. According to the embodiment, individual transformations may receive input of expected form from more than one source or receive no input at all as would a transformation acting as a timestamp. According to the embodiment, individual transformations, may not modify the data as would be encountered with a data store acting as a queue for downstream transformations described in ¶064 of co-pending application Ser. No. 14/925, 974. According to the embodiment, individual transformations may provide output to more than one downstream transformation. This ability lends itself to simulations where multiple possible choices might be made at a single step of a procedure all of which need to be analyzed. While only a single, simple use case has been offered for each example, in each case, that example was chosen for simplicity of description from a plurality of possibilities, the examples given should not be considered to limit the invention to only simplistic applications. Last, according to an embodiment, transformations in a transformation pipeline backbone may form a linear, a quasi-linear arrangement. The result of transformation pipeline analysis may then be modified by results from batch analysis of the data stream and output in format predesigned by the authors of the analysis which could be human readable summary printout, human readable instruction printout, human-readable raw printout, data store, or machine encoded information of any format known to the art to be used in further automated analysis or action schema 405.

Figure 5:
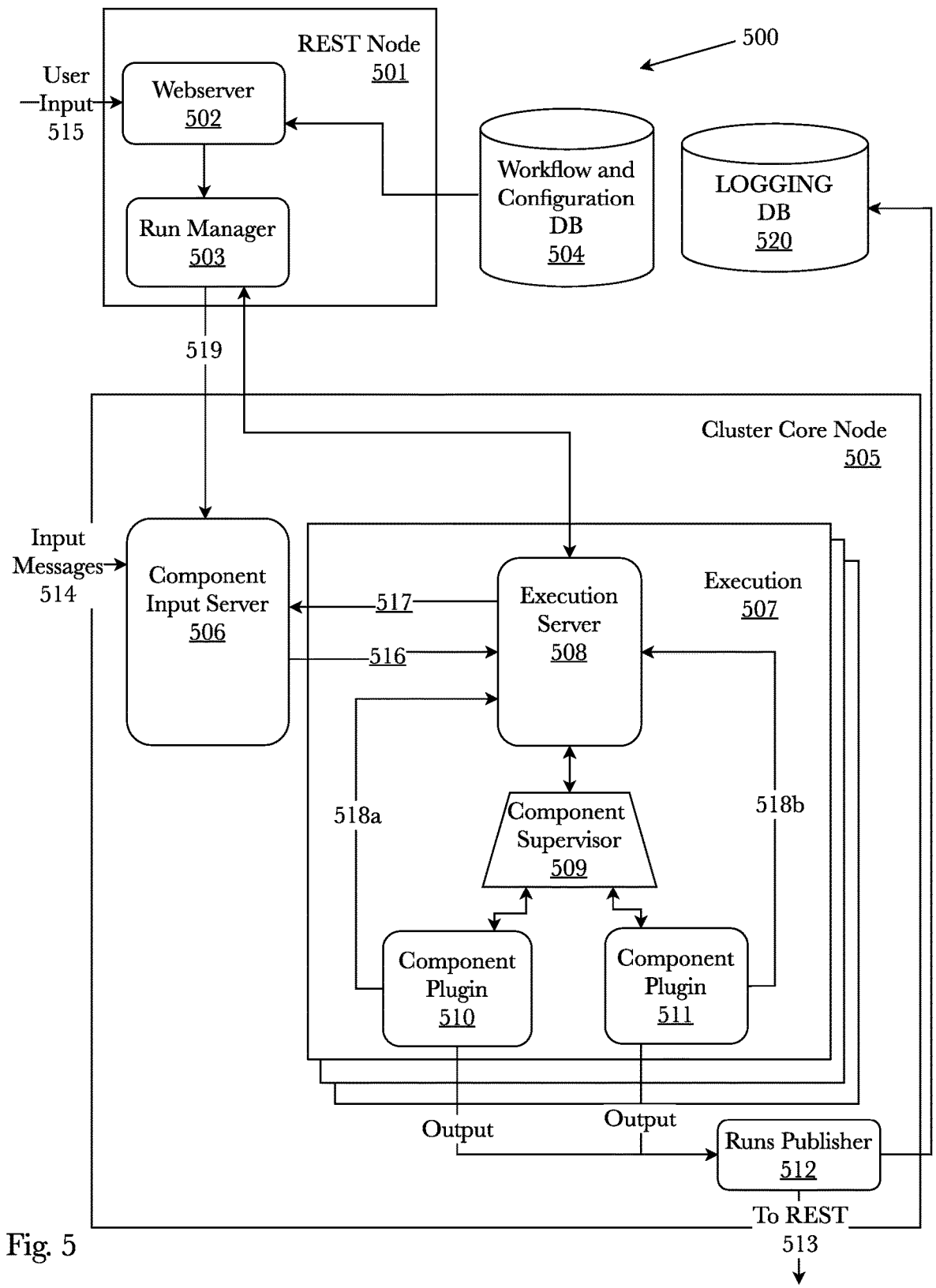
FIG. 5 is a block diagram of an exemplary system architecture for a highly scalable distributed connection interface for data capture from multiple network service sources implementing clustering technique, according to an embodiment.

FIG. 5 is a block diagram of an exemplary system architecture for a highly scalable distributed connection interface 500 for data capture from multiple network service or cloud-based sources implementing clustering technique, according to an embodiment. The implementation of a connector workflow is hereby referred to as a "run." Using a user interface (UT), a connector workflow may be selected from a library of predefined connector workflows, or a custom connector workflow may be easily built and stored into the library for future use. Additionally, each connector workflow may be configured by selecting from a library of common, predefined connector workflow configurations, or a custom configuration may be defined. A database 504 such as PostgreSQL may be used to store the workflows and configurations. A connector workflow configuration specifies the type of data received by each component and what task that component should perform. For example, a component linked to an email client may be configured to perform send, delete, forward, etc. tasks. A run is started when connector workflow has been selected and configured through user input 515 to a webserver 502 hosted within a representational state transfer (REST) node 501. The REST node 501 functions as the manager of a universal API that connects and integrates various network and cloud-based services. The REST node 501 represents the head node of a clustered network and is responsible for managing all other cluster core nodes 505 to optimize scalability and performance of the connector interface 500. REST node 501 listens to this input and instantiates a run manager 503 in REST node 501 and a component input server 506 in any available cluster core node 505, passing it the user-defined configuration of the connector workflow to be started. At configuration time, the system administratively defines and creates instances of execution servers 503. Each connector workflow may have multiple execution servers 508, and these are dedicated to that particular workflow. The run manager 503 will terminate when the run is stopped by the user input 515 or by a fatal error during execution.

The run manager 503 is instantiated when a connector workflow starts. It is in charge of managing the entire run, and will supervise the input server 506 in cluster core node 505. The run manager 503 may be responsible for a variety of functions including, but not limited to start and restart of workflows by spawning processes (and the required components) dynamically on any core node 505, notify each process, receive notification from a process, and store connector workflow status and components on an in memory database such as Mnesia™. The run manager 503 forwards 519 workflow configuration data to the component input server 506.

According to an embodiment, the input server 506 is responsible for listening for and pulling messages from the queue and creating a new execution 507 to process each message separately and concurrently. A processes pool will handle the number of concurrent tasks or executions 507 being performed at any given time. An execution server 508 will persist the state of die execution 507, and start the component plugin(s) 510, 511 through the component supervisor 509, passing the configuration needed for each plugin 510, 511. It may also store the configuration in case a plugin 510, 511 needs to be restarted.

According to an embodiment, each time a new message 514 arrives to die input server 506 it is cached and also sent to the execution server 508 following a round robin assignment algorithm. The input server 506 is a critical component in a cluster core node 505. Only one input server 506 exists for each connector workflow, and it will take care of the following tasks: creating a predefined amount of execution servers 508 distributed in the different core nodes 505; keeping the configuration of the connector workflow in its state to create and restart the execution servers 508; listening to messages coming from a message queue service such as the advanced message queuing protocol (AMPQ); and passing 516 them to the available execution servers 508. Each new input message 514 received by the input server 506 is cached, then every message is sent to the execution server 506. The sent message is removed from the cache after the input server 506 receives an acknowledge signal 517 from the execution server 508 upon reception of the sent message.

An execution (i.e. workflow process) 507 may consist of an execution server 508 which will help keep the state of the execution 507 (one execution server 508 for each input message), and create the component server supervisor 509, passing the configuration needed for each plugin 510, 511. The execution server 508 is the system component that administrates the output part of the connector workflow. The plugins 510, 511 may be created sequentially as they are needed, and torn down when their job is done. For example, if the workflow consists of three plugins, the first one will be the input, which is always listening for new messages. The second plugin 510, 511 will be created to handle the message and process it, and when the task is done, it will send its output 518*a*, 518*b* to the execution server 508 again to create the next plugin and pass the message and so on, until the last plugin finishes and the whole execution 507 is finished. Each plugin 510, 511 is able to communicate with the execution server 508 via the component supervisor 509 and in the event of a plugin failure as communicated by the component supervisor, the execution server 508 will know how to process these errors, while keeping the state of the message which may have had several modifications during the execution 507. This ensures that each plugin is only responsible for handling its own message and does not need to know which following plugin to output it to. Each plugin logs each execution via the runs publisher 512 which persists the execution details to a logging database 520 as well as forwards the execution details to the REST node 513 so that a system user may view the status of each execution 507.

When a connector workflow is stopped normally through user input 515, the system 500 has built in functionality that ensures that messages being processed continue through the workflow. A stop message will go through all the components, preventing them from listening for further messages, and changing their status to "stopping". This status means that the component will not listen for new input, but will complete any pending connector workflow processes. Finally, when everything is done, the components 506, 510, 511 will be killed, and the status of the connector workflow will change to "ready". None of its components 506, 510, 511 will exist anymore until the user starts a new run of the connector workflow again.

Figure 9:
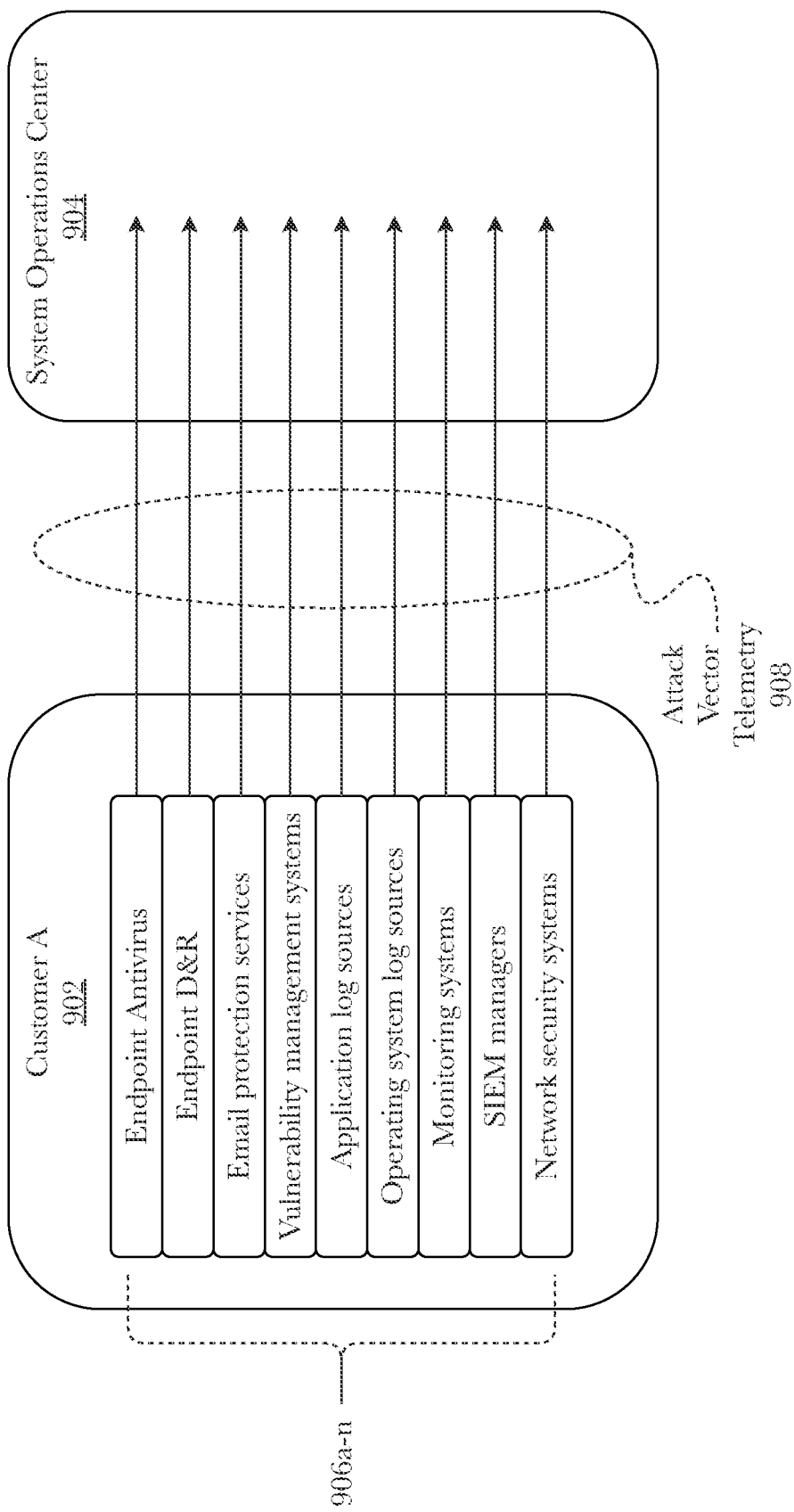
FIG. 9 is a block diagram illustrating one aspect of the current MDR offerings in the art.

FIG. 9 is a block diagram illustrating one aspect of the current MDR offerings in the art. Currently, managed detection and response offerings 904 need to be allowed access to each of their customers' 902 services 906*a-n* that are to be monitored while assuring strict data isolation guarantees in order protect data confidentiality in accordance with individual customer agreements. Endpoint antivirus such as Symantec and McAfee; endpoint detection and response platforms, such as Carbon Black; email protection services, such as Trend Micro, MimeCast, Proofpoint and FireEye; vulnerability management systems, such as Tenable, Nessus, and Qualys; application log sources, such as Apache HTTPD, Nginx, Microsoft SQL Server; operating system log sources, such as Windows Event Logs and Sysmon; monitoring systems, such as BMC and SolarWinds; security incident and event managers, such as Splunk, QRadar and LogRhythm; and network security systems, such as NetWitness, Snort and Bro may all require some form of authentication for services. In order to monitor these services 906*a-n*, data and credentials are sent between the customer 904 and the MDR service 904, each MDR service employing a system operations center 904 that performs cyberdefense operations. This multitude of sessions across many clients necessitates multiple attack vector telemetry 908 collection in order to have actionable insight into adversarial activity. Castles are built with a single ingress and egress for a reason, because too many ways in and out of a defensive position leaves resources thin and weak.

Figure 10:
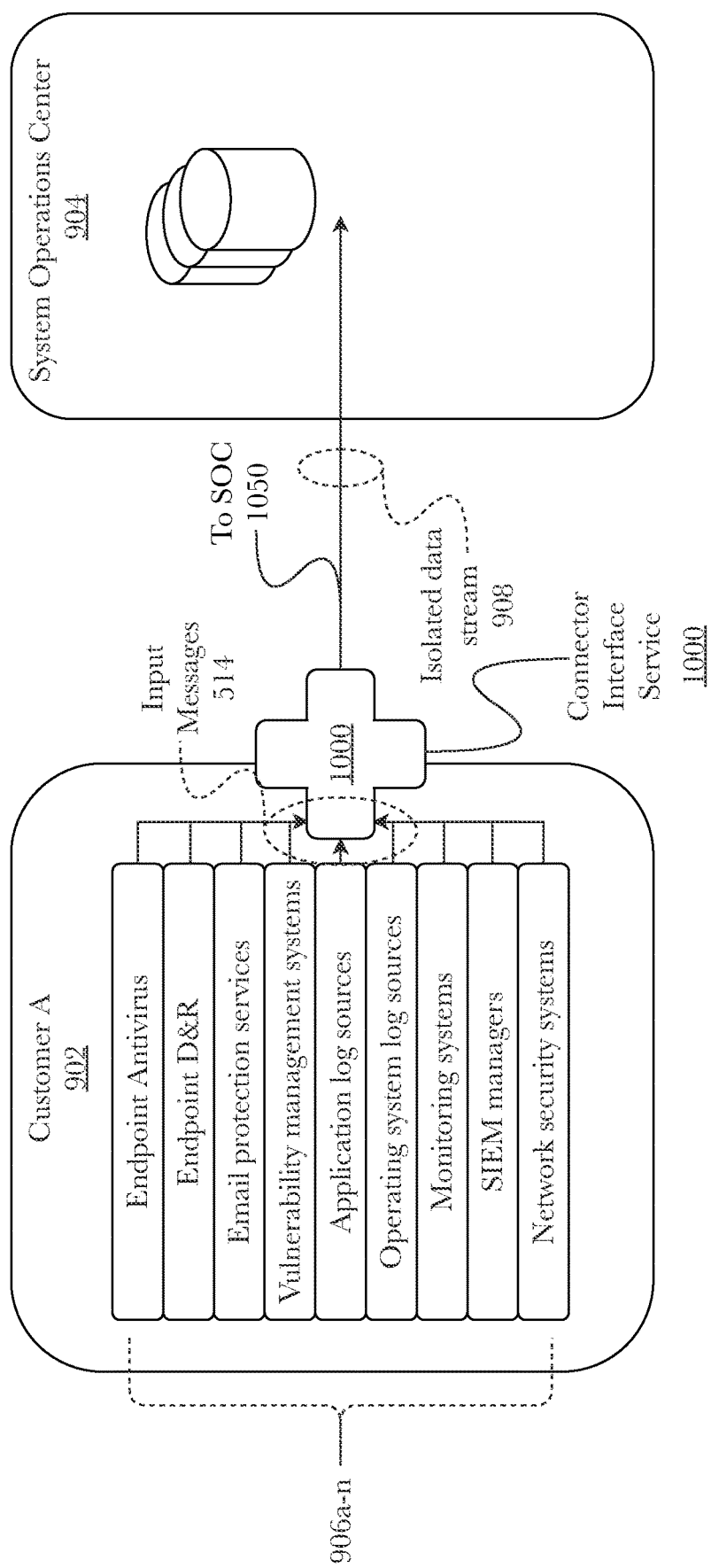
FIG. 10 is block diagram illustrating an exemplary system for improving MDR offerings using a connection interface service.
Figure 11:
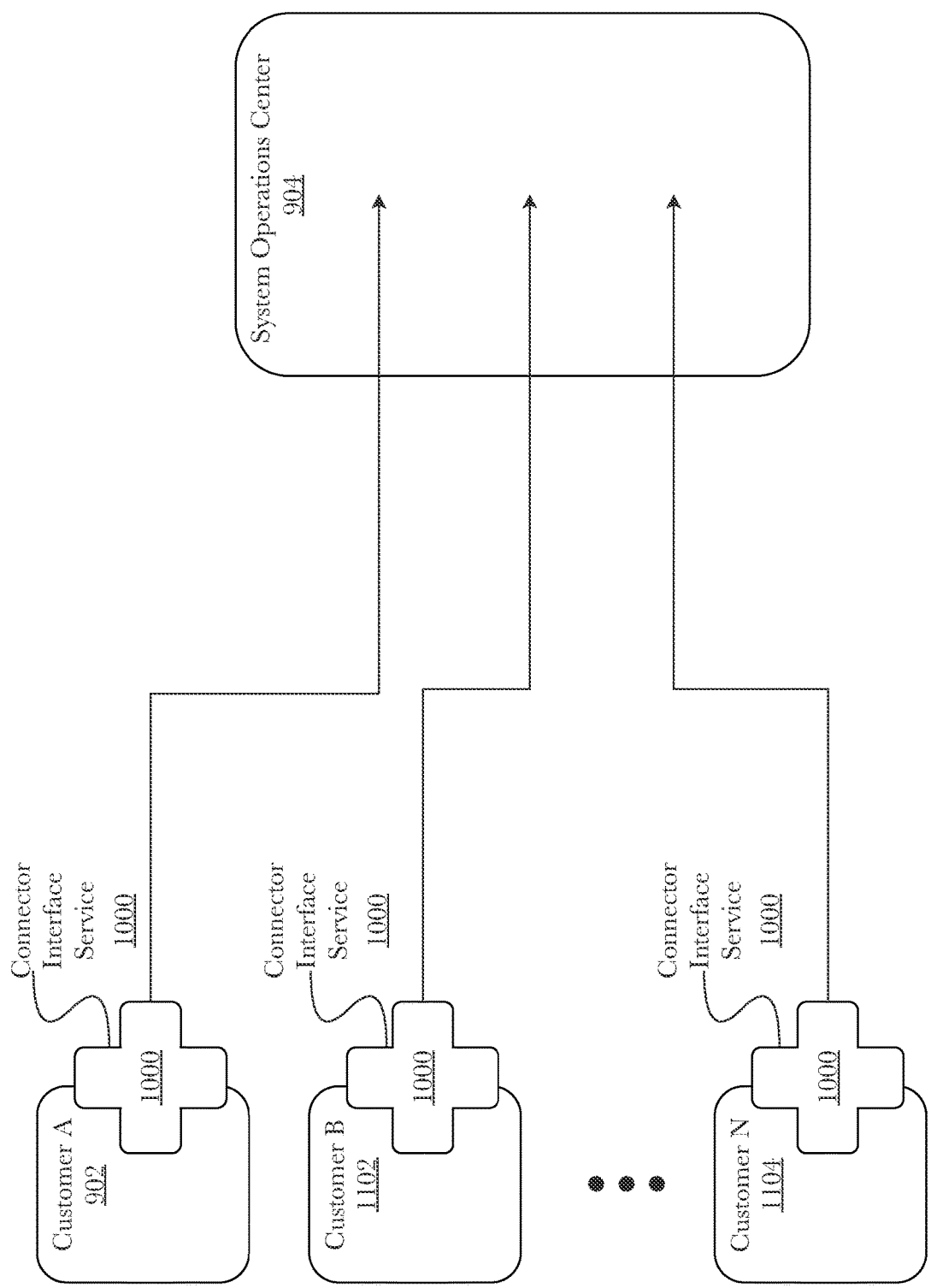
FIG. 11 is a block diagram illustrating the reduced number of attack vectors across multiple clients, according to one aspect.

On the other hand, FIG. 10 is block diagram illustrating an exemplary system for improving MDR offerings using a connection interface service 1000. A connector interface service 1000 aggregates the plurality of data (events, logs, and miscellaneous data) 514 from a plurality of client services 906*a-n* into a single protected data stream 908 leading into a SOC 904. Furthermore, each event and log entry ingested are tagged with information required to facilitate data isolation, proper handling, and provenance across multiple customers and security products. This single encrypted data stream comprising tagged data chunks (events, log entries, etc.) may be deconstructed in the SOC in a security processing facility such that the tagged data is processed and stored only on authorized equipment and by authorized persons as dictated by the processing tags embedded in the data chunk packet. As can be seen from FIG. 11, the reduced number of attack vectors across multiple clients 909/1102/1104 makes the overall detection and response more efficient and compartmentalized in comparison with the current art where there is a myriad of possible vulnerabilities across many vectors.

Figure 12:
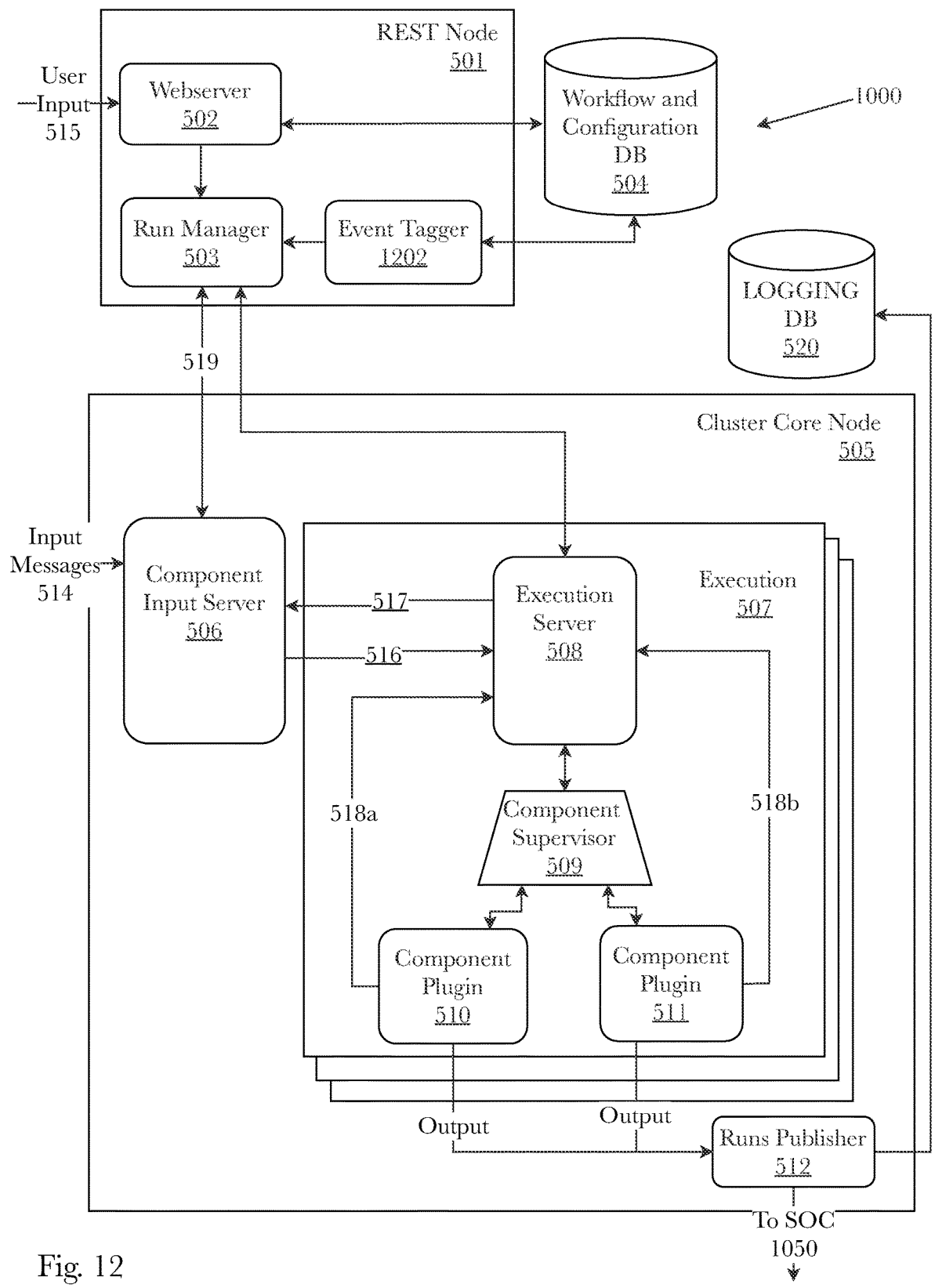
FIG. 12 is a block diagram of an exemplary system architecture for a connection interface service for data capture from multiple network service sources implementing an event tagger, according to an embodiment.

FIG. 12 is a block diagram of an exemplary system architecture for a connection interface service 1000 for data capture from multiple network service sources implementing an event tagger 1202, according to an embodiment. A connection interface service 1000 may comprise one or more components as detailed in FIG. 5, however the addition of an event tagger 1202, additional responsibilities of the workflow and configuration database 504 among other components, and die on-premise implementation is the core of this embodiment 1000.

A user 515 provides input to a web server 502 which employs a declarative connection policy which allows the user 515 to create and store 504 configurations comprising the credentials, processing, and location information required to directly access services used by die client, for the managed detection and response service 1400. The services monitored provide the SOC 904 with events and log information among other pertinent data relating to the cyber-defense of a client's network. Additionally, the user 515 and SOC 904 admin may store rides related to events and log entries of a service that enforces or triggers an action based on the detection of an event or log entry. There may exist a second database in die SOC 904 that enforces or triggers an action based on an event or log entry, and those actions may or may not be the same as the actions stored in die connection interface service 1000. However, it is anticipated that an optimal configuration of rule-databases is to allow rule-synchronization between the SOC 904 and the on-prem connection interface service 1000.

Using the stored service configurations-namely the authentication credentials and access location portion—in the workflow and configuration database 504, a component input server 506 retrieves a plurality of data from each of the services with stored configurations, unless one is not needed, i.e., there is no requirement for authentication to retrieve events, logs, and miscellaneous related data. As each data chunk (e.g., events, logs, and miscellaneous data) is ingested, an event tagger 1202 compares die data chunk to the processing portion of the service's respective configuration file, where the processing portion enables the event tagger to embed the data source and what type and level of processing posture to take. Data sources are typically the client and the service being utilized by the client. The possible levels of processing tags may be altered as needed; however, a few typical ones are as follows: HIPAA 1302, GDPR 1304, CCPA, PIPEDA, POPI, LGPD, and other governmental agencies 1306 to name a few. Processing tags do not have to be from regulatory agencies, such as processing tags created from internal business policies. Moreover, processing tags do not necessarily have to be security related, but may also be used for organizing data according to some other parameters. For example, other tags may also be attached to a data chunk to provide data provenance, the data provenance tags comprising source and time data. Once data chunks are tagged, cluster cores 505 load-balance, organize, and encrypt die tagged data chunks into a single encrypted data stream that is sent 1050 to the SOC 904. A connector workflow configuration—As described in at least FIG. 5—may be used to organize the plurality of data and the plurality of data sources in order to create the single data stream using a distributed computational graph.

Figure 13:
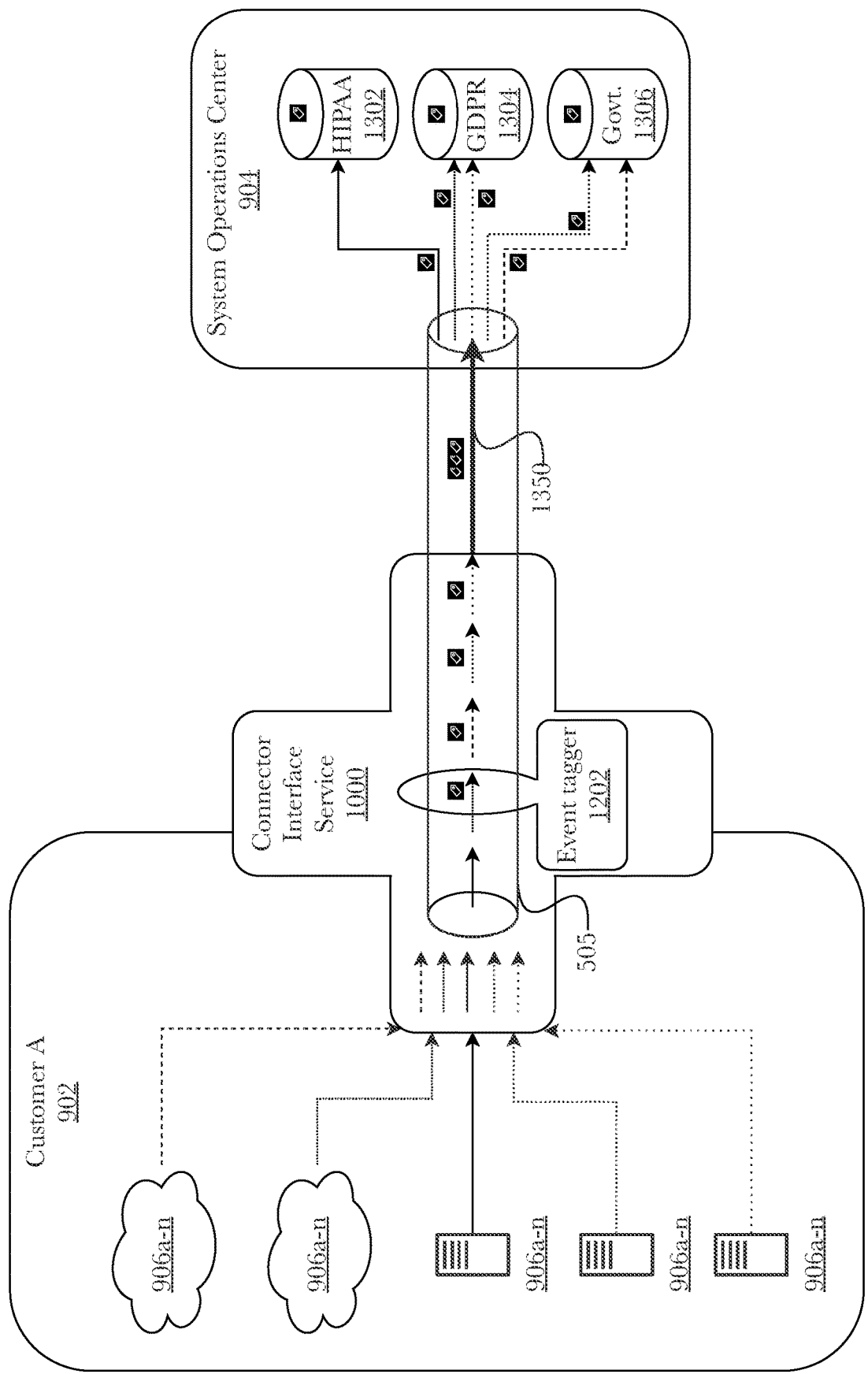
FIG. 13 is a block diagram illustrating the aggregation and tagging of multiple network service sources providing data isolation, proper handling, and data provenance.

FIG. 13 is a block diagram illustrating the aggregation and tagging of multiple network service sources providing data isolation, proper handling, and data provenance. Focusing on the event tagging and aggregation of the connector interface service 1000, it may be seen in the diagram that irrespective of the service source 906a-n-cloud-based or on-premise—connector interface service 1000 retrieves data from a plurality of services 906a-n, tags each respective data chunk, and sends the encrypted and isolated data stream to the SOC 904.

More specifically, imagine each solid and dashed arrow originating from a service source to be one event, log entry, or data chunk. As each data chunk, i.e., the arrows, is fed into the isolated data stream 1350 by the cluster cores 505, it is tagged appropriately by the event tagger 1202 which in turn allows the data stream to be decomposed at the SOC 904, which automatically stores and processes each data chunk in accordance with its respective processing tag.

Figure 15:
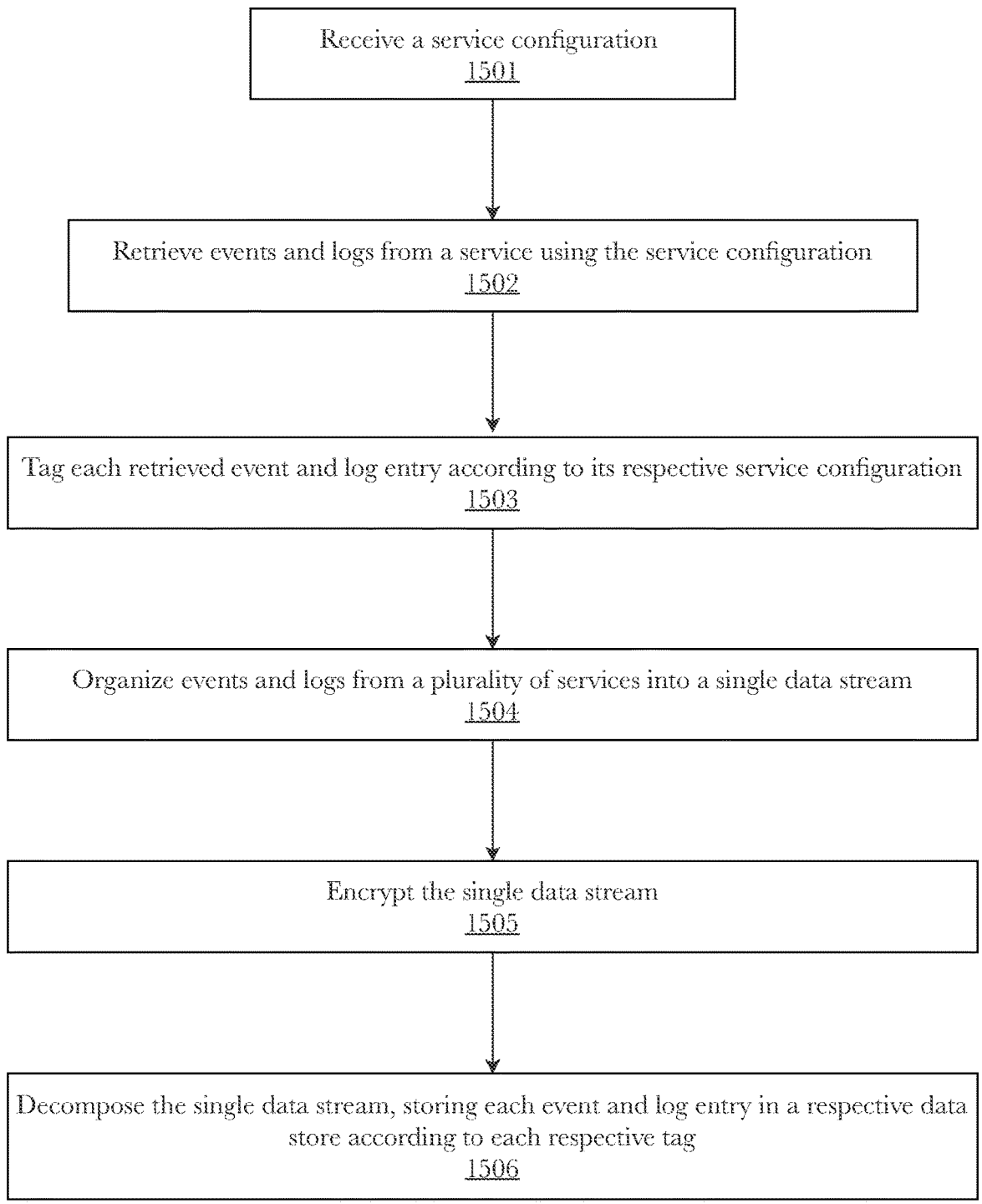
FIG. 15 is a flow diagram of the operation of an exemplary connector interface service according to an embodiment of the invention.

FIG. 15 is a flow diagram of the operation of an exemplary connector interface service according to an embodiment of the invention. In a first step 1501, a connector interface service receives at least one service configuration. Service configurations (See FIG. 14) comprise the credentials needed to authenticate with a service, the location information required to reach/access the service, and any processing tags that apply to the data received by the service. Typically, businesses have a plurality of services, thus it is anticipated that a connector interface service 1000 will receive service configurations for a plurality of different services. In a second step 1502, using the service configurations for the plurality of services, retrieve the events and logs and any other data according to the service configuration from the plurality of services. In a third step 1503, tag each retrieved event and log entry according to its respective service configuration. The processing information in the service configuration dictates who, what, and where data may be processed and stored. These tags may be embedded in one or more layers from the OSI model, or in header information, or some other data packet layer information. In a fourth step 1504, organize the tagged data into a single data stream. In a fifth step 1505, the single data stream is encrypted and sent to the managed detection and response service systems operation center. When the encrypted data stream reaches the systems operation center, a sixth step occurs 1506, whereby the encrypted single data stream is decomposed of its constituent data chunks and each data chunk is stored accordingly to its respective processing tags.

DETAILED DESCRIPTION OF EXEMPLARY ASPECTS

Figure 6:
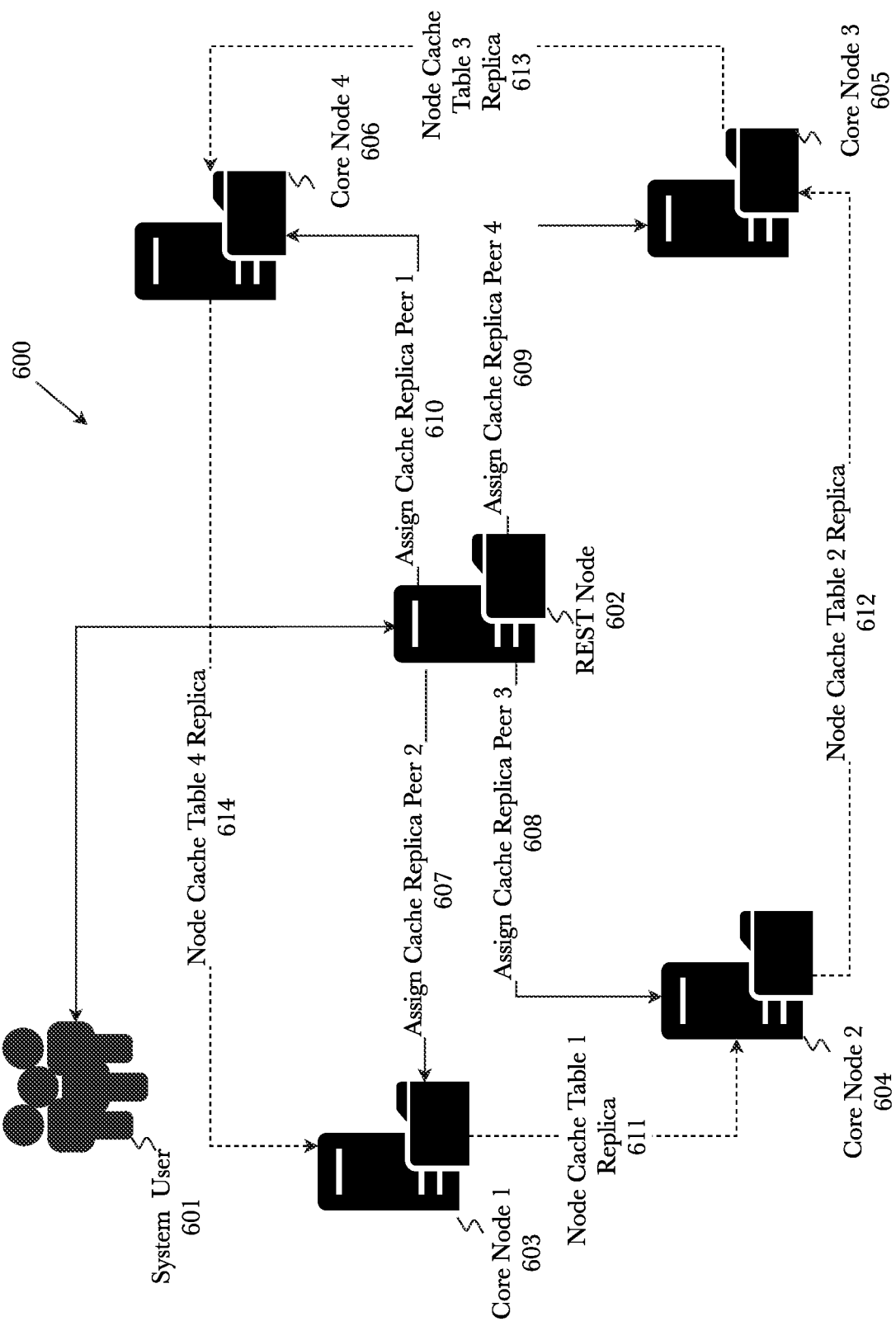
FIG. 6 is a diagram illustrating how implementing a load-balancing connector cluster improves system redundancy and performance, according to an embodiment.

FIG. 6 is a diagram illustrating how implementing a load-balancing connector cluster 600 improves system redundancy and performance, according to an embodiment. Load-balancing clusters are configurations in which cluster nodes share computational workload to provide better overall performance. A cluster has a head node that is responsible for managing cluster node processes. The head node for the connector cluster 600 is the REST node 602 that may be accessed by system users 601 to define connector workflow configurations and manages the execution of the connector workflow by assigning workflow component tasks to and among core nodes 603, 604, 605, 606. Each core node maintains a local node cache table supported by a distributed, real-time database management system, for example Mnesia™. The table is used to cache messages required to start the nest stage, and is stored until the next stage is complete. There may be one table per core node, with each table containing instances of input and execution servers for workflows and their status. Node cache tables may contain information such as a node identifier, workflow identifier, current stage (i.e. input, transformation, output), total number of stages within the workflow, number of active stages within workflow, and a variety of metrics for each stage of the execution. Each node sends a replica of its cache table to the REST node 602 which can view the execution status of all core nodes 603, 604, 605, 606. The REST node 602 can use die cache replicas to quickly restart a workflow on any available core node, should a core node fail. Additionally, the REST node 602 assigns 607, 608, 609, 610 a cache replica peer node to each core node 603, 604, 605, 606. Each core node sends a replica of its cache table 611, 612, 613, 614 to die assigned peer which stores die replica in its RAM or disk space. The peer node provides passive storage of data and does not use the replica data during normal operation. In cases where the REST node 602 does not restart a failed core node, the peer node takes over die processing tasks of the failed node by copying die cache replica into its active cache. For example, core node 1 603 is assigned 607 core node 2 604 as its peer node, and subsequently sends a replica 611 of its node cache table to core node 2 604 which maintains its own active cache, as well as passively storing core node 1's 603 cache table replica. In this way, the connector cluster 600 is able to improve both system redundancy and performance by allowing all core nodes 603, 604, 605, 606 to access to other code node caches via the REST node 602 in the event of failure and by allowing the REST node 602 to shift workflows among and between core nodes so they may be executed concurrently, improving system throughput.

Figure 7:
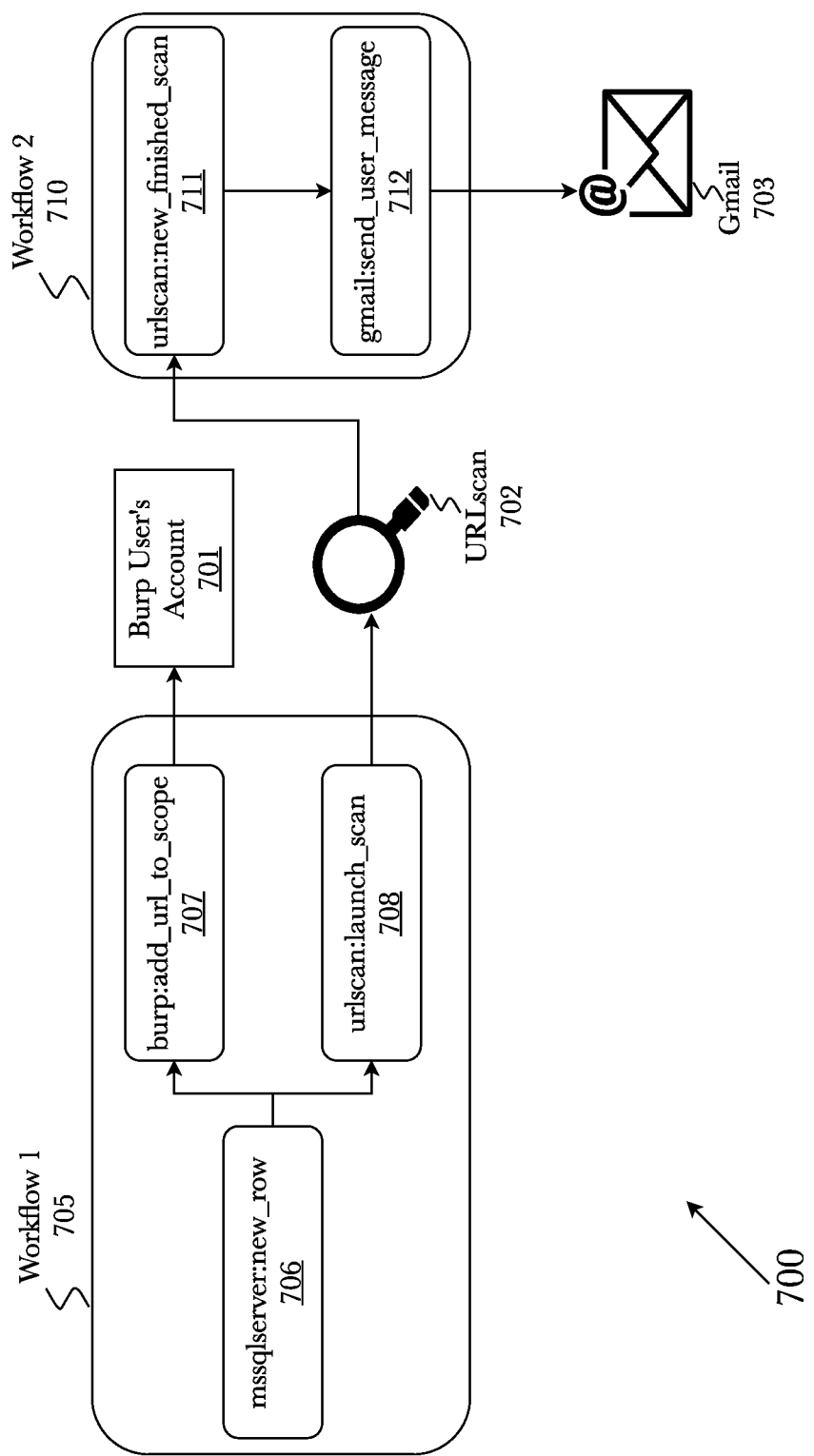
FIG. 7 is block diagram of exemplary connector workflow process for scanning web pages, according to an embodiment.

FIG. 7 is block diagram of exemplary connector workflow process 700 for scanning web pages, according to an embodiment. The connector workflow links data between and among network or cloud-based sources. The process 700 illustrated is a simple example of connector workflow linking data messages from a in network SQL database to multiple cloud-based services such as Burp™, URLscan™, and Gmail™. Each connector workflow 705, 710 may be comprised of an input stage, one or more transformation stages, and an output stage that is most often a network or cloud-based service. Each stage may be configured during workflow construction to perform a specific operation. These operations are declaratively specified using a custom scripting language that facilitates data message exchange between disparate and heterogenous network or cloud-based services. The workflow process 700 of scanning pages can be broken down and performed by two separate workflows 705, 710. Workflow 1 705 looks for new records in a table in a MS SQL server and so the input stage 706 is given the operation function of mssqlserver:new_row, which instructs the input stage to search the MS SQL table row by row for new entries, and uses the URL values stored there to launch new scans 708 using the URLscan 702 could-based service and have the URL value scoped 707 for possible cybersecurity risks using the cloud-based service Burp™ 701. Workflow 2710 searches for finished scans 711 in URLscan 702 and sends an email 712 to the Gmail application 708, notifying when such finished scan was found and a link to the corresponding report. By splitting the workflow process into two separate workflows, each workflow may be executed simultaneously on different core nodes within the connector cluster 600. This increases system performance by increasing throughput an being able to automatically scale as more input messages are received.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of die various embodiments disclosed herein may be implemented in one or more virtualized computing environments (e.g., network computing clouds, virtual machines hosted on one or more physical computing machines, or other appropriate virtual environments).

Figure 16:
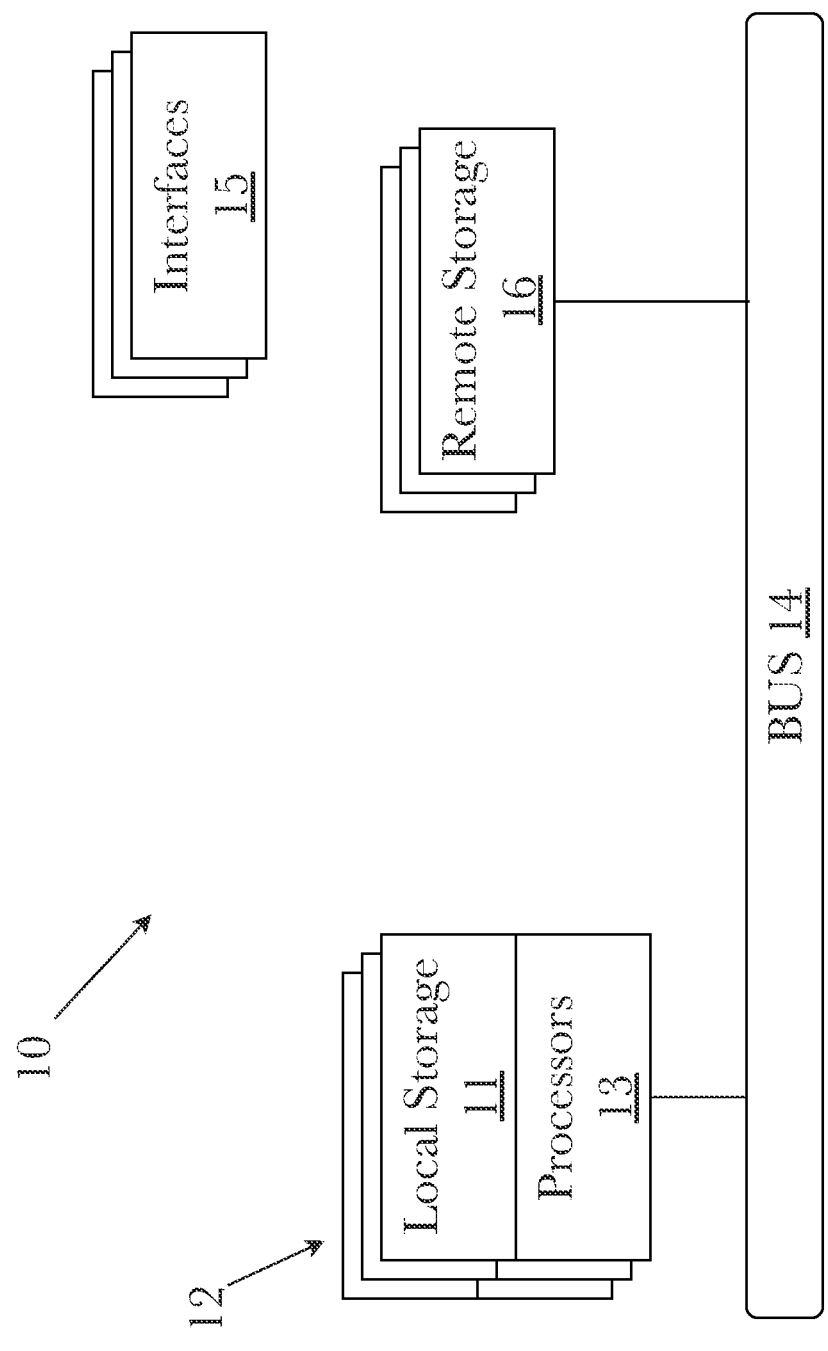
FIG. 16 is a block diagram illustrating an exemplary hardware architecture of a computing device used in various embodiments of the invention.

Referring now to FIG. 16, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (TSB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, die system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 17:
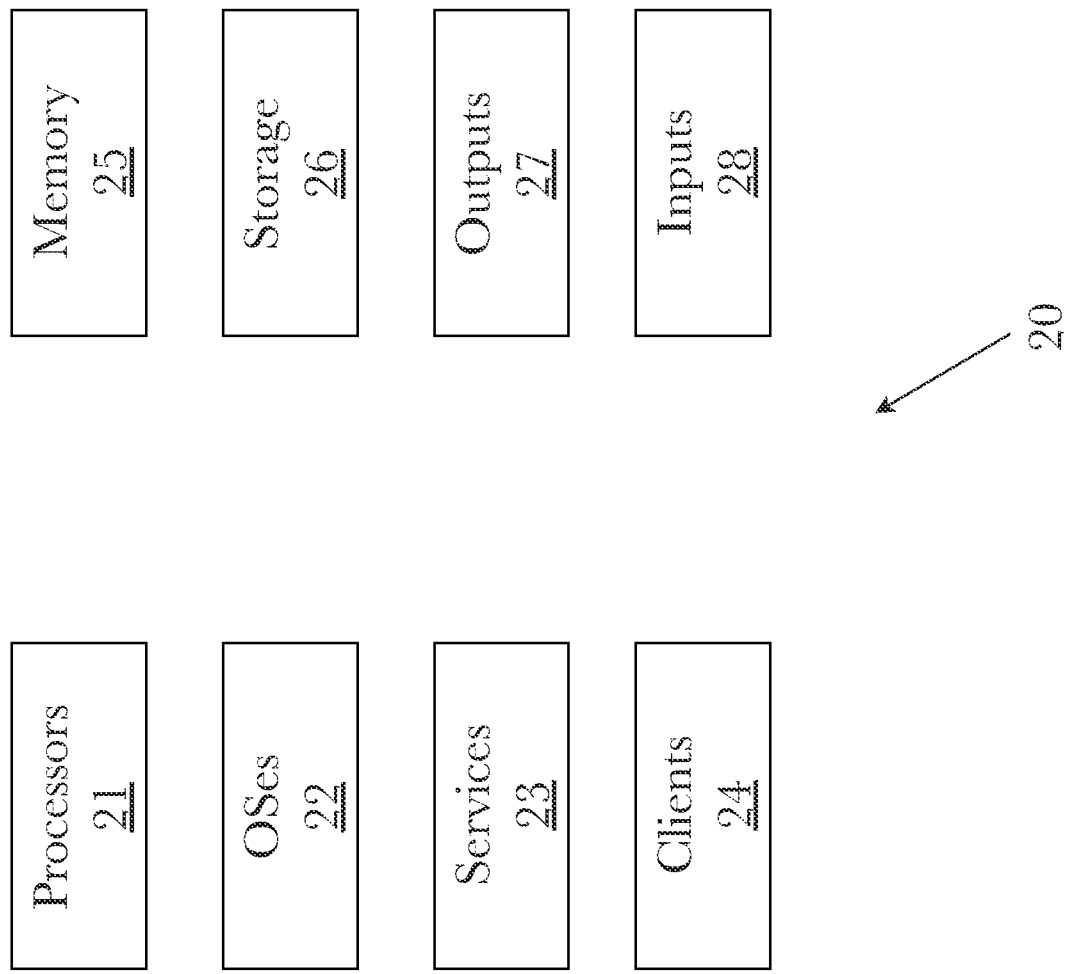
FIG. 17 is a block diagram illustrating an exemplary logical architecture for a client device, according to various embodiments of the invention.

In some embodiments, systems according to the present invention may be implemented on a standalone computing system. Referring now to FIG. 17, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS' operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 18:
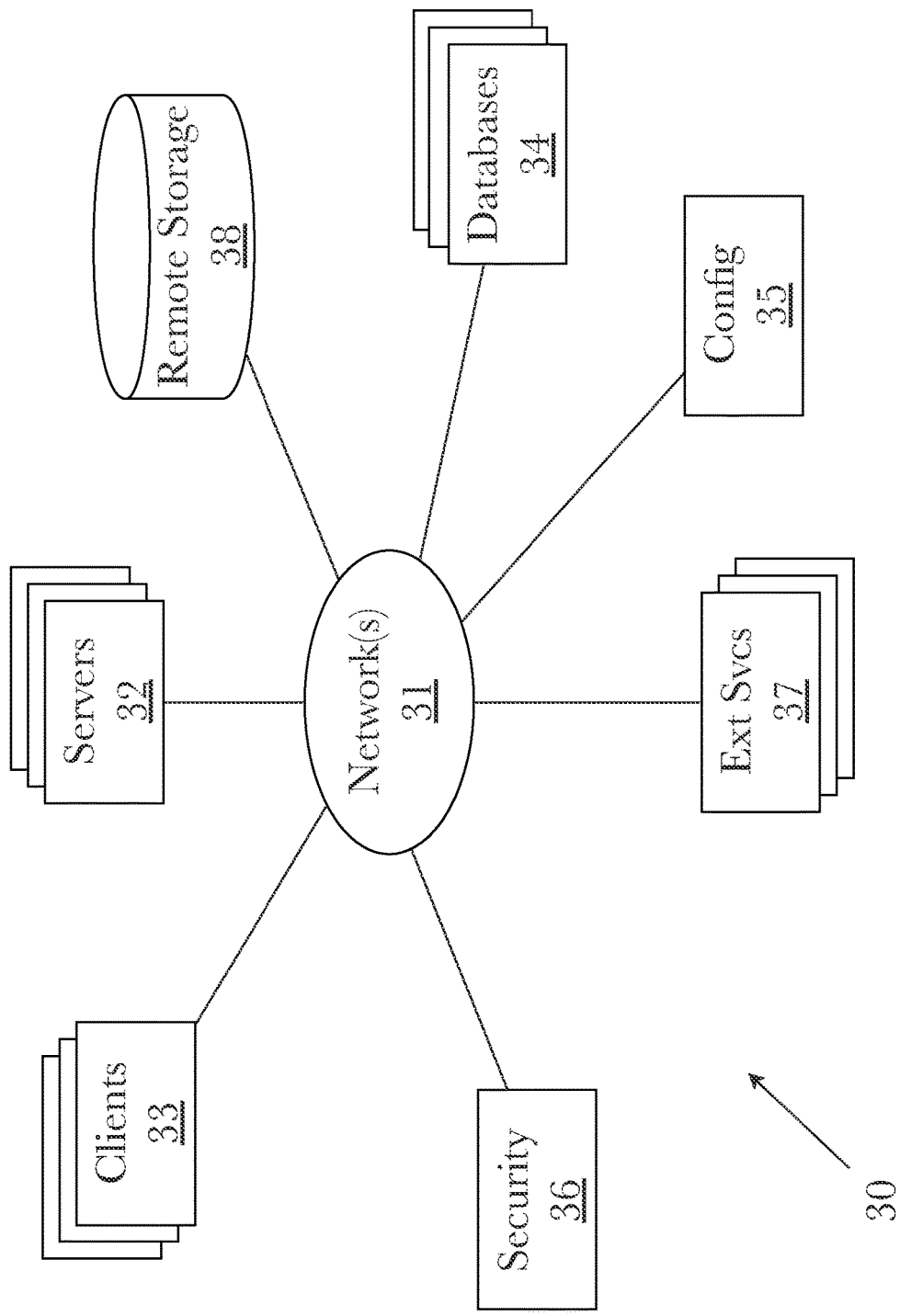
FIG. 18 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 18, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other).

Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 19:
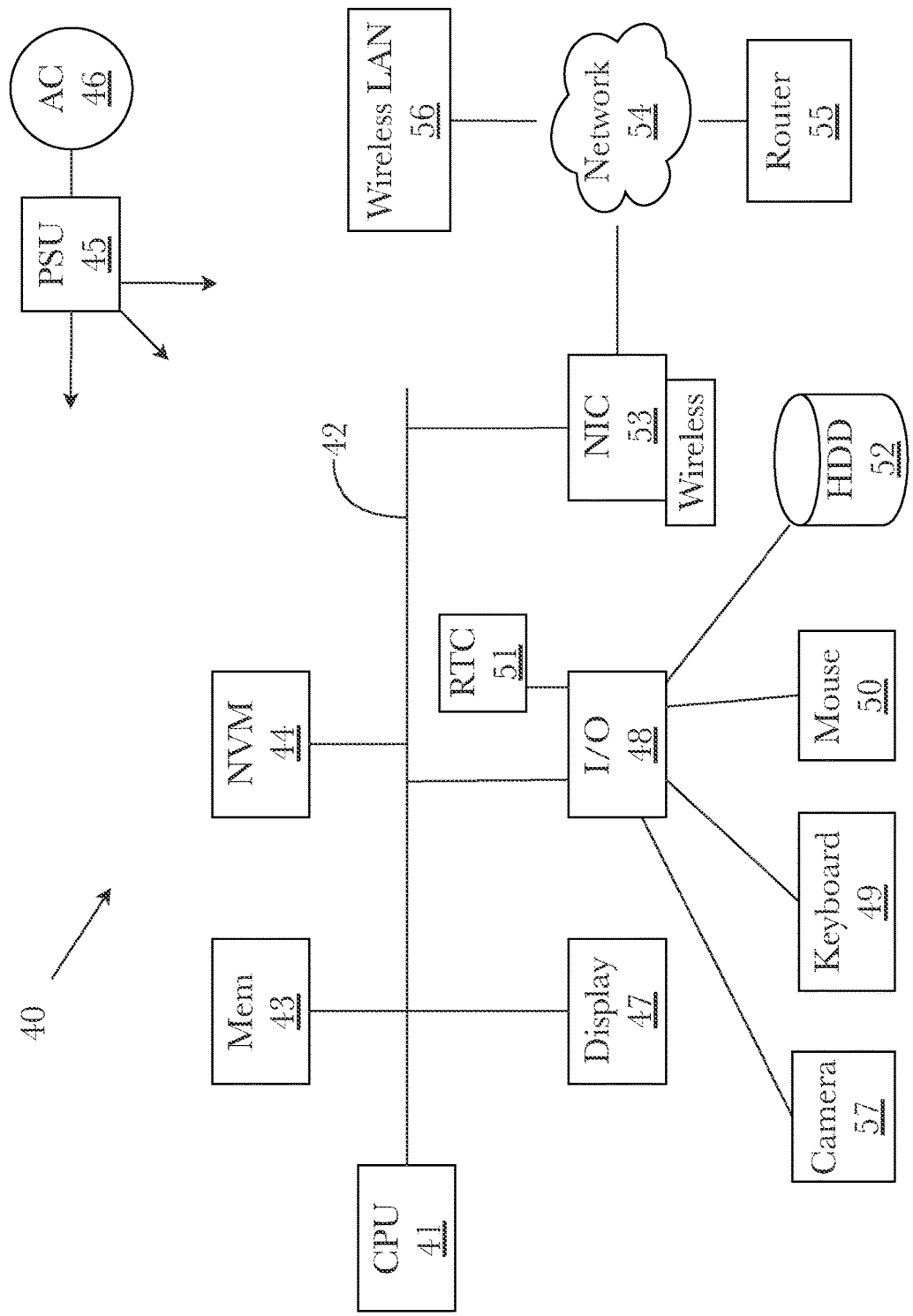
FIG. 19 is another block diagram illustrating an exemplary hardware architecture of a computing device used in various embodiments of the invention.

FIG. 19 shows an exemplary overview of a computer system 40 as may be used in any of the various locations throughout the system. It is exemplary of any computer that may execute code to process data. Various notifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be die Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client.

The skilled person will be aware of a range of possible modifications of the various embodiments described above. Accordingly, the present invention is defined by the claims and their equivalents.

What is claimed is:

1. A system for facilitating data isolation across multiple entities and security products comprising:
 a computing device comprising a plurality of programming instructions cause the computing device to:
  receive a service configuration for a service from a plurality of different managed detection and response client services, wherein the service configuration comprises authentication information, access information, and processing information for the service, wherein the processing information specifies data processing and storage requirements for events associated with the service, wherein the processing information includes regulatory compliance requirements specifying isolation requirements for computing and networking events;
  retrieve data from the service using at least the authentication information and the access information in the service configuration, wherein the retrieved data comprises computing and networking events;
  tag the retrieved data by embedding a tag into each computing and networking event of the retrieved data according to the respective processing information, wherein the embedded tag is used to enforce the data processing and storage requirements specified by the processing information during subsequent processing, wherein the embedded tag comprises an indication of the regulatory compliance requirements for the computing and networking event;

organize the tagged data into a single data stream;

encrypt the single data stream; and send the encrypted data stream comprising the tagged data over a network to a secure processing facility;

a secure processing facility configured to receive the encrypted data stream and use the embedded tags to process the computing and networking events according to their respective requirements by isolating access to the computing and networking events based on the regulatory compliance requirements indicated in the embedded tags.

2. The system of claim 1, wherein the tag further comprises data provenance information.

3. The system of claim 1, wherein the computing device comprises multiple computing systems forming a distributed system.

4. The system of claim 1, wherein the retrieval of data from more than one service is accomplished via a connector workflow configuration.

5. The system of claim 4, wherein the connector workflow configuration is a data processing workflow generated from a distributed computational graph.

6. The system of claim 1, wherein the data is exchanged using a RESTful API that facilitates data exchange between and among cloud-based services.

7. A method for facilitating data isolation across multiple entities and security products, comprising the steps of:

receiving a service configuration for a service from a plurality of different managed detection and response client services, wherein the service configuration comprises authentication information, access information, and processing information for the service, wherein the processing information specifies data processing and storage requirements for events associated with the service, wherein the processing information includes regulatory compliance requirements specifying isolation requirements for computing and networking events;

retrieving data from the service using at least the authentication information and the access information in the service configuration, wherein the retrieved data comprises computing and networking events;

tagging the retrieved data by embedding a tag into each computing and networking event of the retrieve data according to the respective processing information, wherein the embedded tag is used to enforce the data processing and storage requirements specified by the processing information during subsequent processing, wherein the embedded tag comprises an indication of the regulatory compliance requirements for the computing and networking event;

organizing the tagged data into a single data stream;

encrypting the single data stream; and sending the encrypted data stream comprising the tagged data over a network to a secure processing facility;

a secure processing facility configured to receive the encrypted data stream and use the embedded tags to process the computing and networking events according to their respective requirements by isolating access to the computing and networking events based on the regulatory compliance requirements indicated in the embedded tags.

8. The method of claim 7, wherein the tag further comprises data provenance information.

9. The method of claim 7, wherein the retrieval of data from more than one service is accomplished via a connector workflow configuration.

10. The method of claim 9, wherein the connector workflow configuration is a data processing workflow generated from a distributed computational graph.

11. The method of claim 7, wherein the data is exchanged using a RESTful API that facilitates data exchange between and among cloud-based services.

\* \* \* \* \*